(12) United States Patent
Deng

(10) Patent No.: US 8,915,239 B2
(45) Date of Patent: Dec. 23, 2014

(54) DUAL FUEL HEATER WITH SELECTOR VALVE

(76) Inventor: David Deng, Diamond Bar, CA (US)

(*) Notice: Subject to any disclaimer, the term of this patent is extended or adjusted under 35 U.S.C. 154(b) by 405 days.

(21) Appl. No.: 13/311,402

(22) Filed: Dec. 5, 2011

(65) Prior Publication Data

US 2013/0098349 A1   Apr. 25, 2013

(30) Foreign Application Priority Data

Oct. 20, 2011 (CN) .......................... 2011 1 0320667

(51) Int. Cl.
*F24C 1/00* (2006.01)
*F16K 11/10* (2006.01)
*F23C 1/08* (2006.01)

(52) U.S. Cl.
CPC . *F23C 1/08* (2013.01); *F16K 11/10* (2013.01); *F23N 2037/08* (2013.01)
USPC ......... 126/58; 137/597; 137/613; 137/614.11

(58) Field of Classification Search
CPC ........ F23C 1/08; F16K 11/10; F23N 2037/08
USPC ............ 126/58, 39 G, 39 N, 344, 85 R, 39 R; 137/111–114, 256, 265, 267, 572, 398, 137/512, 433, 119.01, 119.06, 119.08, 595, 137/597, 625.11, 625.16, 625.19, 625.42, 137/637.3, 613, 614.11, 862; 244/135 R, 244/135 C, 63, 66; 431/278, 280, 281
See application file for complete search history.

(56) References Cited

U.S. PATENT DOCUMENTS

| | | | | |
|---|---|---|---|---|
| 2,231,460 A | * | 2/1941 | Barman | 137/597 |
| 2,380,956 A | * | 8/1945 | Evarts | 137/113 |
| 2,422,368 A | * | 6/1947 | Ray | 137/66 |
| 2,518,894 A | * | 8/1950 | Humbarger et al. | 137/113 |

(Continued)

FOREIGN PATENT DOCUMENTS

CN   102506198   6/2012
GB   1381887   1/1975

(Continued)

OTHER PUBLICATIONS

International Search Report and Written Opinion for International Application No. PCT/US2013/056024, Notification mailed Jan. 9, 2014.

(Continued)

*Primary Examiner* — Kenneth Rinehart
*Assistant Examiner* — Bao D Nguyen
(74) *Attorney, Agent, or Firm* — Knobbe Martens Olson & Bear LLP

(57) ABSTRACT

A heater assembly can be used with a gas appliance. The gas appliance can be a dual fuel appliance for use with one of a first fuel type or a second fuel type different than the first. The heater assembly can include at least one pressure regulator, a housing, and an actuation member. The housing has a first fuel hook-up for connecting the first fuel type to the heater assembly, a second fuel hook-up for connecting the second fuel type to the heater assembly, and an internal valve. The actuation member can control the position of the internal valve based on whether the first or the second fuel hook-up is used.

47 Claims, 30 Drawing Sheets

(56) References Cited

U.S. PATENT DOCUMENTS

| | | | |
|---|---|---|---|
| 2,556,337 A | 6/1951 | Paille | |
| 2,630,821 A * | 3/1953 | Arey et al. | 137/113 |
| 2,661,157 A * | 12/1953 | Reichelderfer | 236/91 R |
| 2,687,140 A * | 8/1954 | St. Clair | 137/113 |
| 2,905,361 A | 9/1959 | Noall | |
| 3,001,541 A * | 9/1961 | St. Clair | 137/113 |
| 3,032,096 A | 5/1962 | Stout et al. | |
| 3,067,773 A * | 12/1962 | Olander | 137/613 |
| 3,100,504 A * | 8/1963 | Kauer, Jr. | 137/494 |
| 3,244,193 A * | 4/1966 | Loveless | 137/454.6 |
| 3,331,392 A | 7/1967 | Davidson et al. | |
| 3,430,655 A | 3/1969 | Forney | |
| 3,577,877 A * | 5/1971 | Warne | 60/39.281 |
| 3,578,015 A * | 5/1971 | Andersen | 137/113 |
| 3,630,652 A * | 12/1971 | Nutten et al. | 431/173 |
| 3,734,132 A * | 5/1973 | Kuhnelt | 137/625.49 |
| 3,804,109 A * | 4/1974 | Martin et al. | 137/119.08 |
| 3,825,027 A * | 7/1974 | Henderson | 137/265 |
| 3,829,279 A | 8/1974 | Qualley et al. | |
| RE28,447 E | 6/1975 | Bonner et al. | 137/613 |
| 3,939,871 A * | 2/1976 | Dickson | 137/625.47 |
| 4,005,724 A * | 2/1977 | Courtot | 137/38 |
| 4,021,190 A * | 5/1977 | Dickson | 431/280 |
| 4,067,354 A * | 1/1978 | St. Clair | 137/329.4 |
| 4,081,235 A * | 3/1978 | van der Veer | 431/54 |
| 4,101,257 A | 7/1978 | Straitz, III | |
| 4,146,056 A * | 3/1979 | Buchanan | 137/630.22 |
| 4,290,450 A * | 9/1981 | Swanson | 137/606 |
| 4,301,825 A * | 11/1981 | Simko | 137/111 |
| 4,386,625 A * | 6/1983 | Perkins et al. | 137/255 |
| 4,454,892 A * | 6/1984 | Chadshay | 137/607 |
| 4,538,644 A * | 9/1985 | Knutson et al. | 137/625.64 |
| 4,653,530 A * | 3/1987 | Kelly | 137/489.5 |
| 4,683,864 A * | 8/1987 | Bucci | 123/575 |
| 4,718,448 A * | 1/1988 | Love et al. | 137/271 |
| 4,768,543 A | 9/1988 | Wienke et al. | |
| 4,796,652 A * | 1/1989 | Hafla | 137/116.3 |
| 4,874,006 A * | 10/1989 | Iqbal | 137/119.05 |
| 4,895,184 A * | 1/1990 | Abbey | 137/625.29 |
| 4,930,538 A * | 6/1990 | Browne | 137/269 |
| 5,044,390 A * | 9/1991 | Kelly et al. | 137/66 |
| 5,048,563 A * | 9/1991 | Buchanan et al. | 137/597 |
| 5,090,451 A * | 2/1992 | Buchanan et al. | 137/630.22 |
| 5,097,818 A * | 3/1992 | Kee et al. | 126/39 E |
| 5,172,728 A | 12/1992 | Tsukazaki | |
| 5,245,997 A * | 9/1993 | Bartos | 128/205.24 |
| 5,379,794 A * | 1/1995 | Brown | 137/75 |
| 5,413,141 A * | 5/1995 | Dietiker | 137/489 |
| 5,494,072 A * | 2/1996 | Schinowsky | 137/597 |
| 5,544,538 A * | 8/1996 | Takagi et al. | 74/335 |
| 5,785,075 A * | 7/1998 | Uchida et al. | 137/115.1 |
| 5,787,928 A * | 8/1998 | Allen et al. | 137/625.43 |
| 5,971,746 A | 10/1999 | Givens et al. | |
| 5,975,112 A | 11/1999 | Ohmi et al. | |
| 5,988,204 A | 11/1999 | Reinhardt et al. | |
| 5,988,214 A * | 11/1999 | Tajima et al. | 137/596 |
| 6,026,849 A * | 2/2000 | Thordarson | 137/501 |
| 6,035,893 A * | 3/2000 | Ohmi et al. | 137/597 |
| 6,247,486 B1 * | 6/2001 | Schwegler et al. | 137/115.27 |
| 6,257,270 B1 * | 7/2001 | Ohmi et al. | 137/240 |
| 6,347,644 B1 * | 2/2002 | Channell | 137/597 |
| 6,354,078 B1 | 3/2002 | Karlsson et al. | |
| 6,402,052 B1 * | 6/2002 | Murawa | 239/284.1 |
| 6,431,957 B1 * | 8/2002 | Lefky | 451/36 |
| 6,607,854 B1 | 8/2003 | Rehg et al. | |
| 6,634,351 B2 * | 10/2003 | Arabaolaza | 126/39 G |
| 6,672,326 B2 * | 1/2004 | Pappalardo et al. | 137/66 |
| 6,786,194 B2 | 9/2004 | Koegler et al. | |
| 6,832,628 B2 * | 12/2004 | Thordarson et al. | 137/613 |
| 6,938,634 B2 * | 9/2005 | Dewey, Jr. | 137/1 |
| 6,941,962 B2 * | 9/2005 | Haddad | 137/1 |
| 7,044,729 B2 * | 5/2006 | Ayastuy et al. | 431/25 |
| 7,201,186 B2 * | 4/2007 | Ayastuy | 137/601.19 |
| 7,228,872 B2 * | 6/2007 | Mills | 137/595 |
| 7,386,981 B2 | 6/2008 | Zielinski et al. | |
| 7,434,447 B2 * | 10/2008 | Deng | 73/23.2 |
| 7,487,888 B1 | 2/2009 | Pierre, Jr. | |
| 7,533,656 B2 * | 5/2009 | Dingle | 123/507 |
| 7,559,339 B2 * | 7/2009 | Golan et al. | 137/625.41 |
| 7,591,257 B2 * | 9/2009 | Bayer et al. | 123/575 |
| 7,607,426 B2 | 10/2009 | Deng | |
| 7,654,820 B2 * | 2/2010 | Deng | 431/74 |
| 8,011,920 B2 | 9/2011 | Deng | |
| 8,152,515 B2 | 4/2012 | Deng | |
| 8,464,754 B2 * | 6/2013 | Stretch et al. | 137/597 |
| 8,622,069 B2 * | 1/2014 | Ferreira | 137/15.06 |
| 8,757,139 B2 * | 6/2014 | Deng | 126/85 R |
| 2003/0150496 A1 * | 8/2003 | Rousselin | 137/613 |
| 2003/0213523 A1 * | 11/2003 | Neff | 137/625.65 |
| 2004/0011411 A1 * | 1/2004 | Thordarson et al. | 137/613 |
| 2004/0025949 A1 * | 2/2004 | Wygnaski | 137/624.18 |
| 2004/0238030 A1 * | 12/2004 | Dewey, Jr. | 137/66 |
| 2004/0238047 A1 * | 12/2004 | Kuraguchi et al. | 137/613 |
| 2006/0065315 A1 * | 3/2006 | Neff et al. | 137/625.65 |
| 2007/0154856 A1 | 7/2007 | Hallit et al. | |
| 2007/0215223 A1 * | 9/2007 | Morris | 137/627.5 |
| 2007/0277803 A1 * | 12/2007 | Deng | 126/92 AC |
| 2007/0277812 A1 * | 12/2007 | Deng | 126/92 AC |
| 2007/0277813 A1 * | 12/2007 | Deng | 126/92 R |
| 2008/0041470 A1 * | 2/2008 | Golan et al. | 137/625.41 |
| 2008/0153044 A1 * | 6/2008 | Deng | 431/74 |
| 2008/0153045 A1 * | 6/2008 | Deng | 431/76 |
| 2008/0223465 A1 * | 9/2008 | Deng | 137/625.4 |
| 2008/0227045 A1 * | 9/2008 | Deng | 431/354 |
| 2010/0037884 A1 * | 2/2010 | Deng | 126/116 A |
| 2010/0095945 A1 * | 4/2010 | Manning | 126/116 R |
| 2010/0132626 A1 * | 6/2010 | Torgerson et al. | 119/651 |
| 2010/0163125 A1 * | 7/2010 | Igarashi | 137/597 |
| 2010/0326430 A1 | 12/2010 | Deng | |
| 2010/0330513 A1 | 12/2010 | Deng | |
| 2011/0143294 A1 | 6/2011 | Deng | |
| 2011/0193000 A1 * | 8/2011 | Miyazoe et al. | 251/129.01 |
| 2011/0226355 A1 * | 9/2011 | Benvenuto et al. | 137/487.5 |
| 2012/0118238 A1 * | 5/2012 | Torgerson et al. | 119/14.18 |

FOREIGN PATENT DOCUMENTS

| | | |
|---|---|---|
| GB | 2210155 | 6/1989 |
| JP | 58 219320 A | 12/1983 |
| JP | 59009425 | 1/1984 |
| JP | 10141656 | 5/1998 |
| JP | 11192166 | 7/1999 |
| JP | 2000234738 | 8/2000 |
| JP | 2003 074837 A | 3/2003 |
| JP | 2003-74838 | 12/2003 |

OTHER PUBLICATIONS

International Search Report and Written Opinion for International Application No. PCT/US2012/034983, Notification mailed Jul. 24, 2012.

* cited by examiner

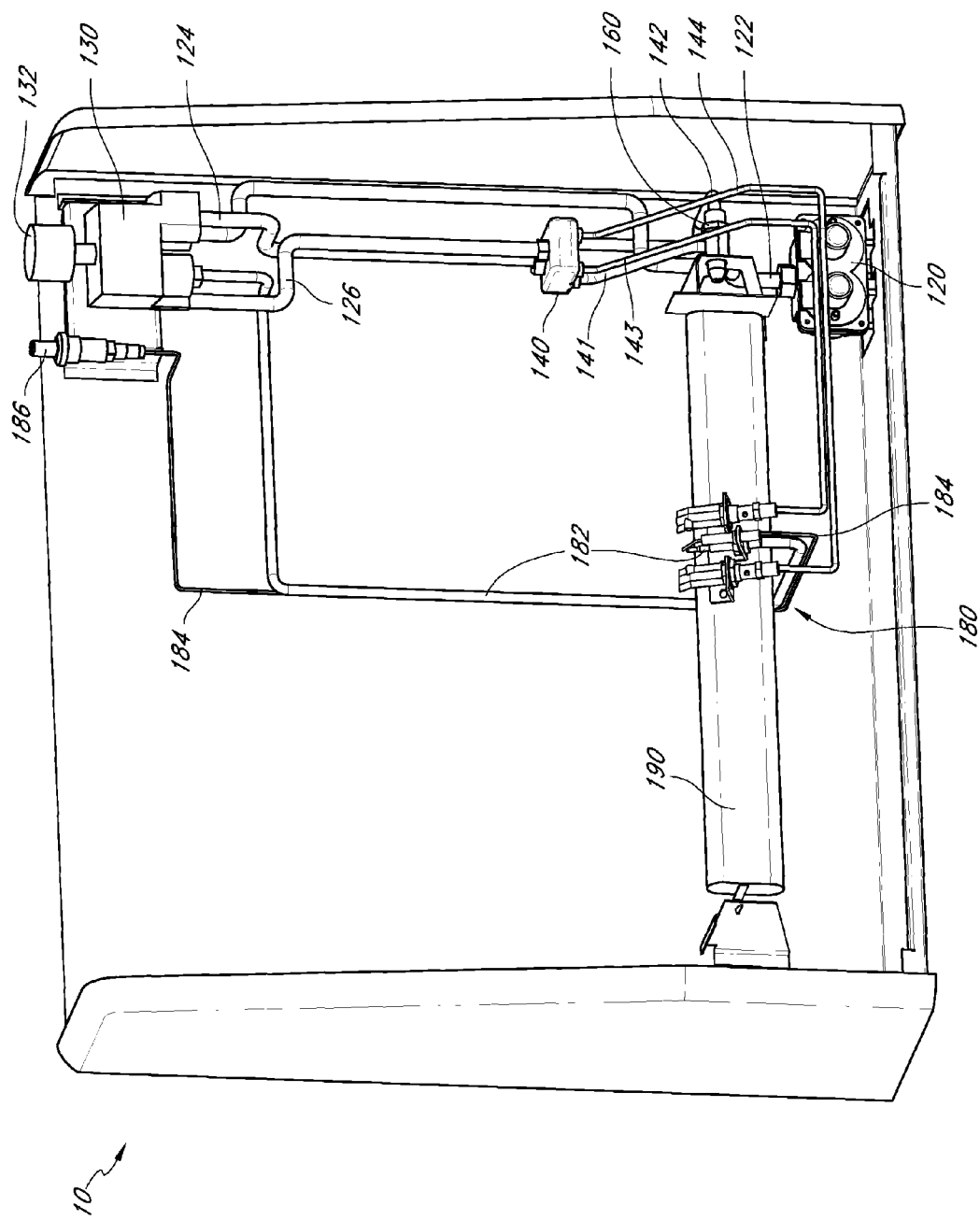

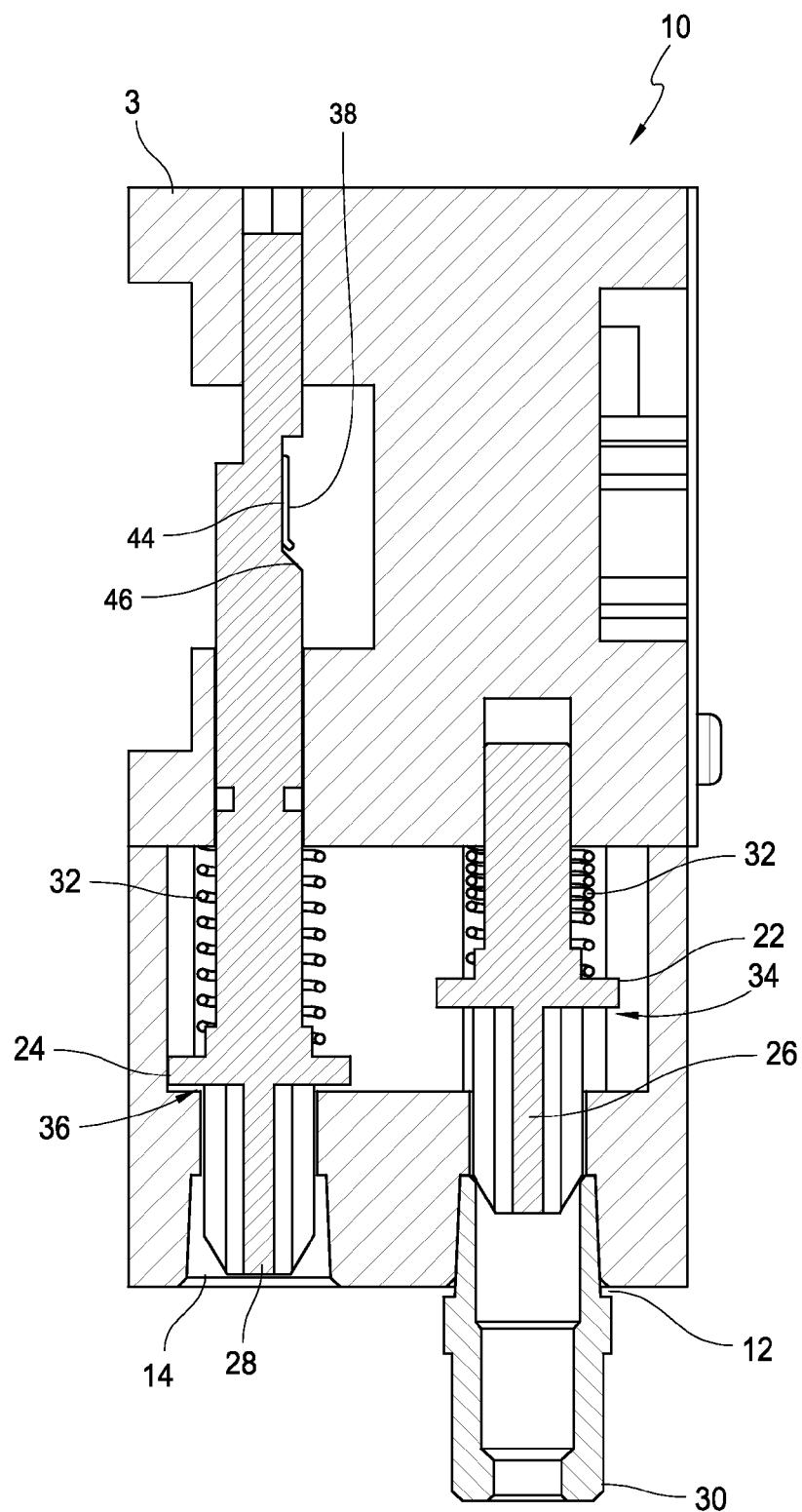
FIG. 4A1

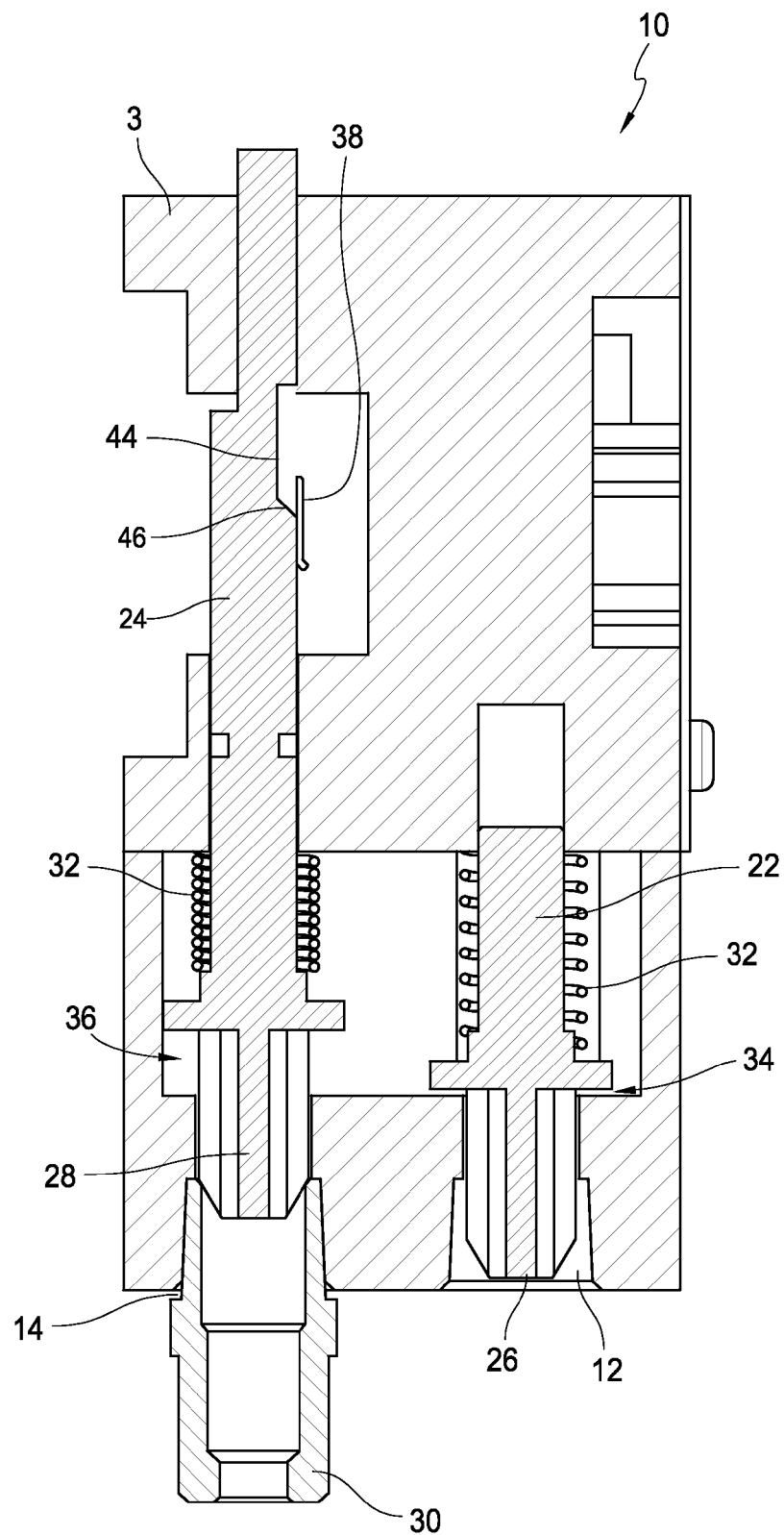
FIG. 4A2

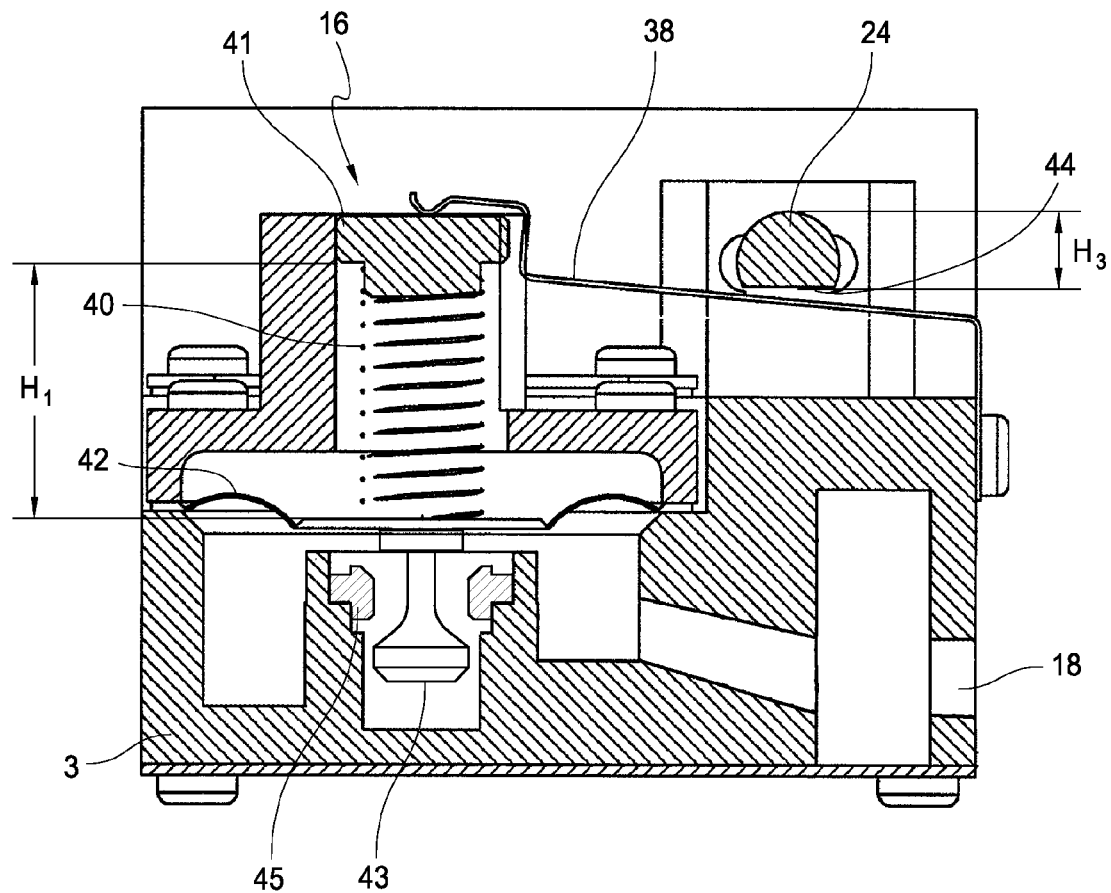
FIG. 4B1

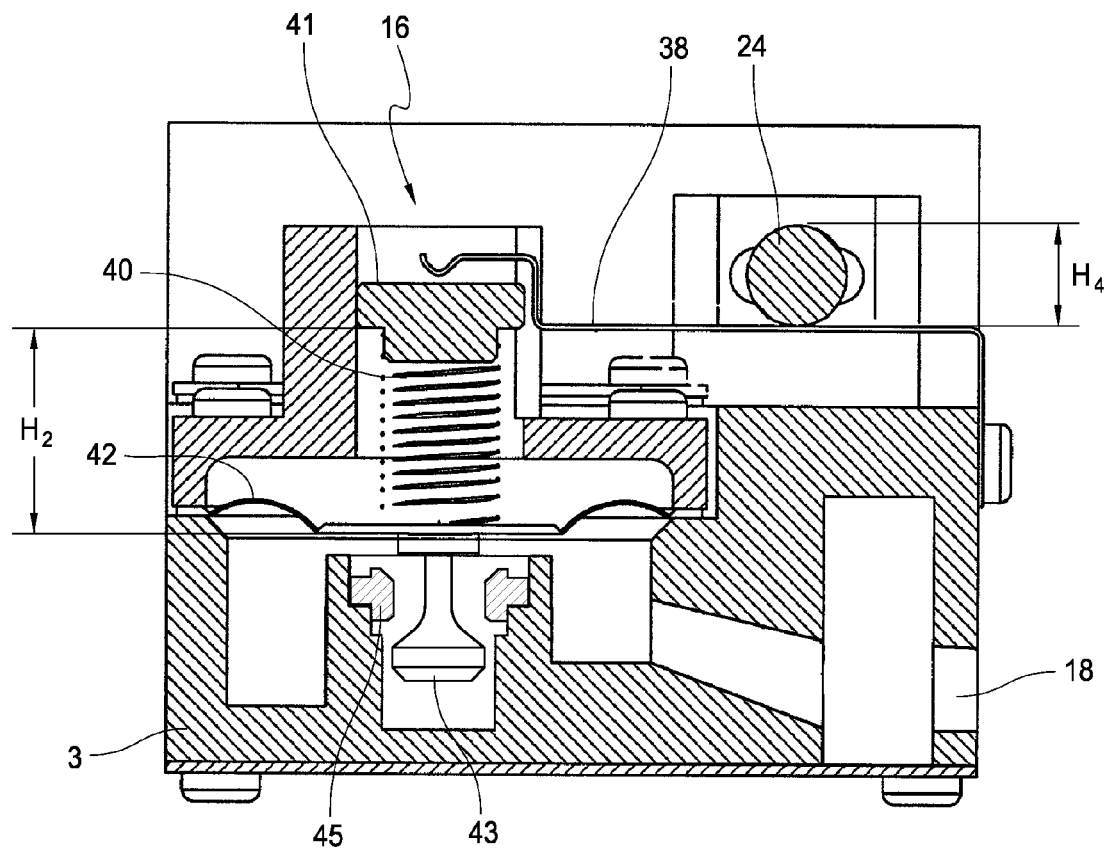
FIG. 4B2

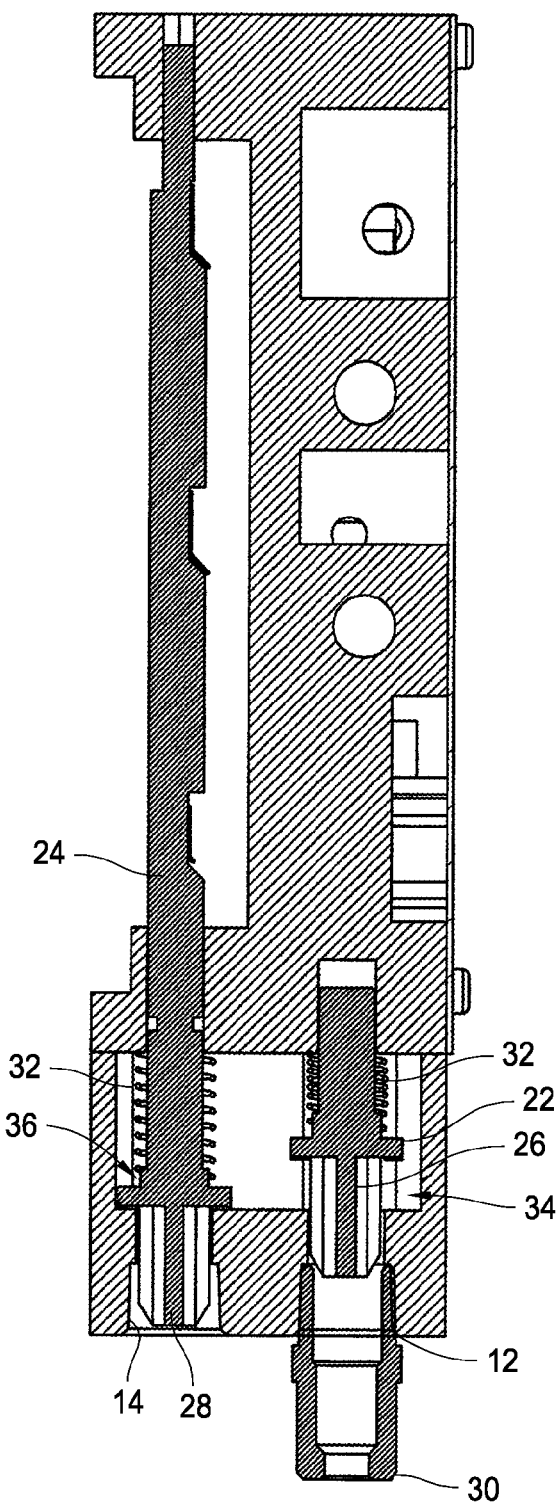
FIG. 9A1

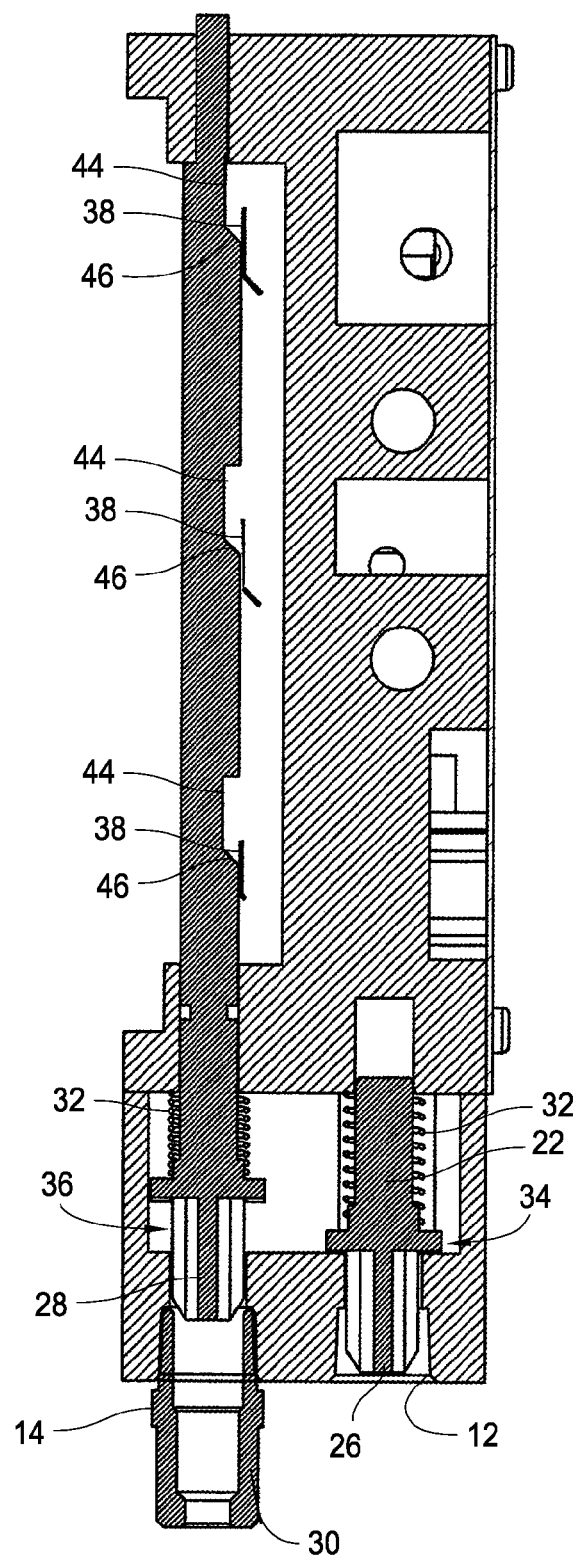
FIG. 9A2

DUAL FUEL HEATER WITH SELECTOR VALVE

CROSS-REFERENCE TO RELATED APPLICATIONS

This application is related to and claims priority to Chinese Patent Application No. 201110320667.6, filed on Oct. 20, 2011, the entire application of which is hereby incorporated by reference.

BACKGROUND OF THE INVENTION

1. Field of the Invention

Certain embodiments disclosed herein relate generally to a heating apparatus for use in a gas appliance particularly adapted for dual fuel use. The heating apparatus can be, can be a part of, and can be used in or with many different appliances, including, but not limited to: heaters, boilers, dryers, washing machines, ovens, fireplaces, stoves, water heaters, barbeques, etc.

2. Description of the Related Art

Many varieties of appliances, such as heaters, boilers, dryers, washing machines, ovens, fireplaces, stoves, and other heat-producing devices utilize pressurized, combustible fuels. Some such devices operate with liquid propane, while others operate with natural gas. However, such devices and certain components thereof have various limitations and disadvantages. Therefore, there exists a constant need for improvement in appliances and components to be used in appliances.

SUMMARY OF THE INVENTION

A heater assembly can be used with one of a first fuel type or a second fuel type different than the first. The heater assembly can include at least one pressure regulator, a housing, and an actuation member. The housing has a first fuel hook-up for connecting the first fuel type to the heater assembly, a second fuel hook-up for connecting the second fuel type to the heater assembly, and an internal valve. The actuation member can control the position of the internal valve based on whether the first or the second fuel hook-up is used or selected.

A heater assembly according to some embodiments can comprise a pressure regulator having a first position and a second position, a housing having first and second fuel hook-ups, and an actuation member. The first fuel hook-up can be for connecting a first fuel type to the heater assembly and the second hook-up can be for connecting a second fuel type to the heater assembly. The actuation member can have an end located within the second fuel hook-up and a first position and a second position. The actuation member can be configured such that connecting a fuel source to the heater assembly at the second fuel hook-up moves the actuation member from the first position to the second position which causes the pressure regulator to move from the first position to the second position. The pressure regulator in the second position can be configured to regulate a fuel flow of the second fuel type within a predetermined range.

The heater assembly can have a pressure regulator where the first position is configured to regulate a fuel flow of the first fuel type within a predetermined range different than the predetermined range for the second fuel type. Alternatively, the heater assembly can include a second pressure regulator configured to regulate a fuel flow of the first fuel type within a predetermined range different than the predetermined range for the second fuel type.

The actuation member can comprise a rod configured for linear advancement from the first position to the second position. The rod can extend along a longitudinal axis and have a plurality of longitudinal cross-sections of different shapes. A first section of the actuation member can be associated with the pressure regulator in the first position and a second section of the actuation member can be associated with the pressure regulator in the second position, the first section having a longitudinal cross-section of a different shape than the second section.

The heater assembly can further include additional valves that can also be controlled with the actuation member. The heater assembly can also include an additional actuation member.

In some embodiments, a heater assembly can comprise at least one pressure regulator, a housing, and a first actuation member. The housing can include a first fuel hook-up for connecting the first fuel type to the heater assembly, a second fuel hook-up for connecting the second fuel type to the heater assembly, a first inlet, a first outlet, a second outlet configured with an open position and a closed position, and a first valve configured to open and close the second outlet. The first actuation member can have an end located within the second fuel hook-up and a first position and a second position. The first actuation member can be configured such that connecting a fuel source to the heater assembly at the second fuel hook-up moves the actuation member from the first position to the second position which causes the first valve to open the second outlet, the second outlet being in fluid communication with the second fuel hook-up.

The first actuation member can be further configured such that connecting the fuel source to the heater assembly at the second fuel hook-up moves the first actuation member from the first position to the second position which causes the at least one pressure regulator to move from a first position to a second position, wherein the at least one pressure regulator in the second position is configured to regulate a fuel flow of the second fuel type within a predetermined range.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

FIG. 2 is a perspective cutaway view of the heater of FIG. 1.

FIGS. 4A1 and 4A2 show the heating source of FIG. 4A in two different positions.

FIGS. 4B1 and 4B2 are cross-sections of the heating source of FIG. 4A taken along line B-B in two different positions.

FIGS. 9A1 and 9A2 show the heating source of FIG. 9A in two different positions.

DETAILED DESCRIPTION OF THE PREFERRED EMBODIMENT

Many varieties of space heaters, fireplaces, stoves, ovens, boilers, fireplace inserts, gas logs, and other heat-producing devices employ combustible fuels, such as liquid propane and natural gas. These devices generally are designed to operate with a single fuel type at a specific pressure. For example, as one having skill in the art would appreciate, some gas heaters that are configured to be installed on a wall or a floor operate with natural gas at a pressure in a range from about 3 inches of water column to about 6 inches of water column, while others operate with liquid propane at a pressure in a range from about 8 inches of water column to about 12 inches of water column.

In many instances, the operability of such devices with only a single fuel source is disadvantageous for distributors, retailers, and/or consumers. For example, retail stores often try to predict the demand for natural gas units versus liquid propane units over a given season, and accordingly stock their shelves and/or warehouses with a percentage of each variety of device. Should such predictions prove incorrect, stores can be left with unsold units when the demand for one type of unit was less than expected, while some potential customers can be left waiting through shipping delays or even be turned away empty-handed when the demand for one type of unit was greater than expected. Either case can result in financial and other costs to the stores. Additionally, some consumers can be disappointed to discover that the styles or models of stoves, fireplaces or other device, with which they wish to improve their homes, are incompatible with the fuel sources with which their homes are serviced.

Certain advantageous embodiments disclosed herein reduce or eliminate these and other problems associated with devices having heating sources that operate with only a single type of fuel source. Furthermore, although certain of the embodiments described hereafter are presented in the context of vent-free heating systems, the apparatus and devices disclosed and enabled herein can benefit a wide variety of other applications and appliances.

Figure 1:
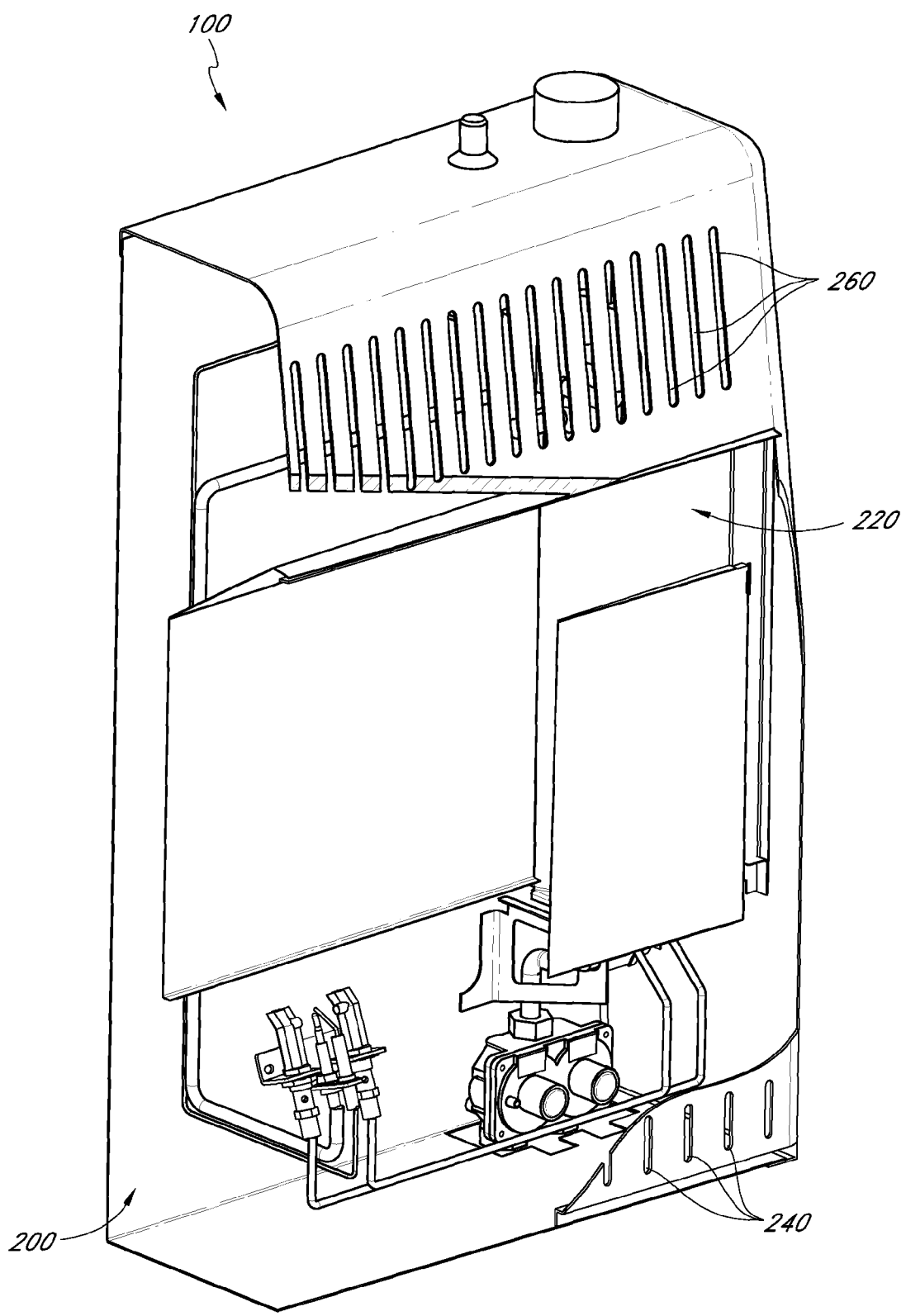
FIG. 1 is a perspective cutaway view of a portion of one embodiment of a heater configured to operate using either a first fuel source or a second fuel source.

FIG. 1 illustrates one embodiment of a heater 100. The heater 100 can be a vent-free infrared heater, a vent-free blue flame heater, or some other variety of heater, such as a direct vent heater. Some embodiments include boilers, stoves, dryers, fireplaces, gas logs, etc. Other configurations are also possible for the heater 100. In many embodiments, the heater 100 is configured to be mounted to a wall or a floor or to otherwise rest in a substantially static position. In other embodiments, the heater 100 is configured to move within a limited range. In still other embodiments, the heater 100 is portable.

The heater 100 can comprise a housing 200. The housing 200 can include metal or some other suitable material for providing structure to the heater 100 without melting or otherwise deforming in a heated environment. In the illustrated embodiment, the housing 200 comprises a window 220, one or more intake vents 240 and one or more outlet vents 260. Heated air and/or radiant energy can pass through the window 220. Air can flow into the heater 100 through the one or more intake vents 240 and heated air can flow out of the heater 100 through the outlet vents 260.

With reference to FIG. 2, in certain embodiments, the heater 100 includes a regulator 120. The regulator 120 can be coupled with an output line or intake line, conduit, or pipe 122. The intake pipe 122 can be coupled with a heater control valve 130, which, in some embodiments, includes a knob 132. As illustrated, the heater control valve 130 is coupled to a fuel supply pipe 124 and an oxygen depletion sensor (ODS) pipe 126, each of which can be coupled with a fluid flow controller 140. The fluid flow controller 140 can be coupled with a first nozzle line 141, a second nozzle line 142, a first ODS line 143, and a second ODS line 144. In some embodiments, the first and the second nozzle lines 141, 142 are coupled with a nozzle 160, and the first and the second ODS lines 143, 144 are coupled with an ODS 180. In some embodiments, the ODS comprises a thermocouple 182, which can be coupled with the heater control valve 130, and an igniter line 184, which can be coupled with an igniter switch 186. Each of the pipes 122, 124, and 126 and the lines 141-144 can define a fluid passageway or flow channel through which a fluid can move or flow.

In some embodiments, including the illustrated embodiment, the heater 100 comprises a burner 190. The ODS 180 can be mounted to the burner 190, as shown. The nozzle 160 can be positioned to discharge a fluid, which may be a gas, liquid, or combination thereof into the burner 190. For purposes of brevity, recitation of the term "gas or liquid" hereafter shall also include the possibility of a combination of a gas and a liquid. In addition, as used herein, the term "fluid" is a broad term used in its ordinary sense, and includes materials or substances capable of fluid flow, such as gases, liquids, and combinations thereof.

Where the heater 100 is a dual fuel heater, either a first or a second fluid is introduced into the heater 100 through the regulator 120. Still referring to FIG. 2, the first or the second fluid proceeds from the regulator 120 through the intake pipe 122 to the heater control valve 130. The heater control valve 130 can permit a portion of the first or the second fluid to flow into the fuel supply pipe 124 and permit another portion of the first or the second fluid to flow into the ODS pipe 126. From the heater control valve 130, the first or the second fluid can proceed to the fluid flow controller 140. In many embodiments, the fluid flow controller 140 is configured to channel the respective portions of the first fluid from the fuel supply pipe 124 to the first nozzle line 141 and from the ODS pipe 126 to the first ODS line 143 when the fluid flow controller 140 is in a first state, and is configured to channel the respective portions of the second fluid from the fuel supply pipe 124 to the second nozzle line 142 and from the ODS pipe 126 to the second ODS line 144 when the fluid flow controller 140 is in a second state.

In certain embodiments, when the fluid flow controller 140 is in the first state, a portion of the first fluid proceeds through the first nozzle line 141, through the nozzle 160 and is delivered to the burner 190, and a portion of the first fluid proceeds through the first ODS line 143 to the ODS 180. Similarly, when the fluid flow controller 140 is in the second state, a portion of the second fluid proceeds through the nozzle 160 and another portion proceeds to the ODS 180. As discussed in more detail below, other configurations are also possible.

A heating assembly or heating source 10 that can be used with the heater 100, or other gas appliances, will now be described. The heating source 10 can be configured such that the installer of the gas appliance can connect the assembly to one of two fuels, such as either a supply of natural gas (NG) or a supply of propane (LP) and the assembly will desirably operate in the standard mode (with respect to efficiency and flame size and color) for either gas.

Figure 3A:
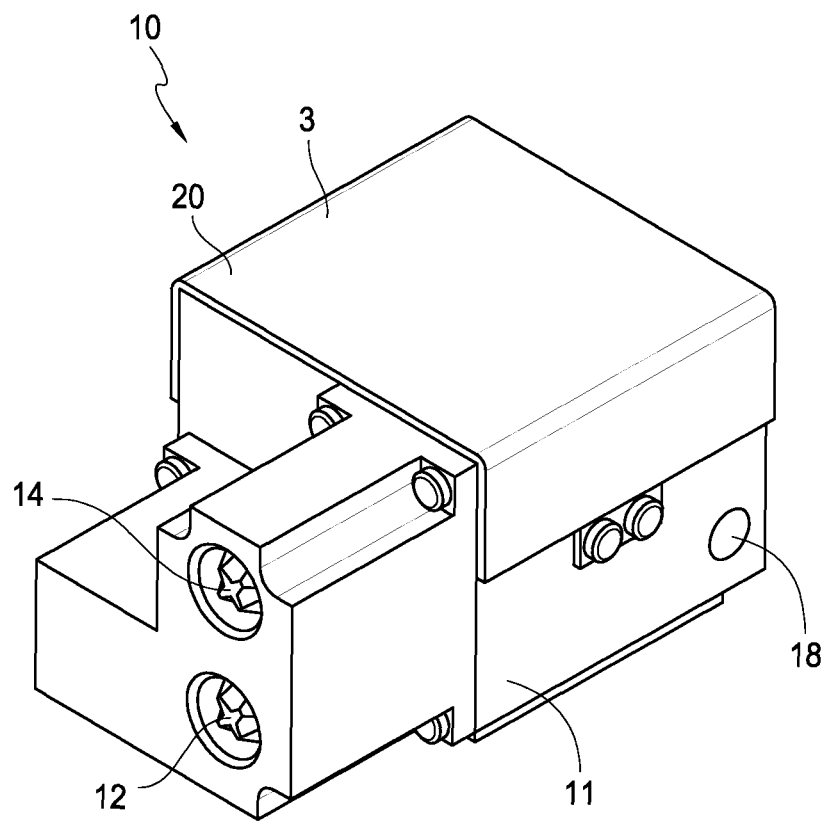
FIG. 3A is perspective view of one embodiment of a heating source.

Looking at FIGS. 3A-4B2, a heating source 10 can comprise a fuel selector valve 3. The fuel selector valve 3 can be used for selecting between two different fuels and for setting certain parameters, such as one or more flow paths, and/or a setting on one or more pressure regulators based on the desired and selected fuel. The fuel selector valve 3 can have a first mode configured to direct a flow of a first fuel (such as NG) in a first path through the fuel selector valve 3 and a second mode configured to direct a flow of a second fuel (such as LP) in a second path through the fuel selector valve 3.

The fuel selector valve 3 can further comprise first and second fuel source connections or hook-ups 12, 14. The fuel selector valve 3 can connect to one of two different fuel sources, each fuel source having a different type of fuel therein. For example, one fuel source can be a cylinder of LP and another fuel source can be a NG fuel line in a house, connected to a city gas line. The first and second fuel source connections 12, 14 can comprise any type of connection such as a threaded connection, a locking connection, an advance and twist type connection, etc.

Figure 3B:
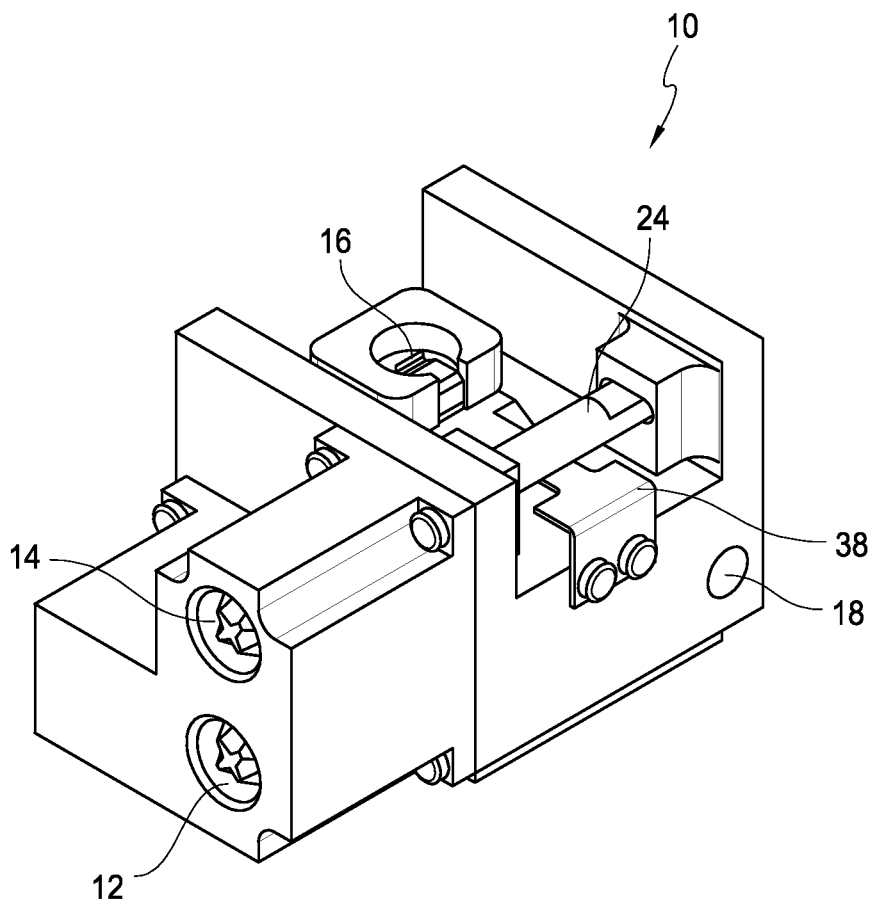
FIG. 3B is a perspective view of the partially disassembled heating source of FIG. 3A.
Figure 3C:
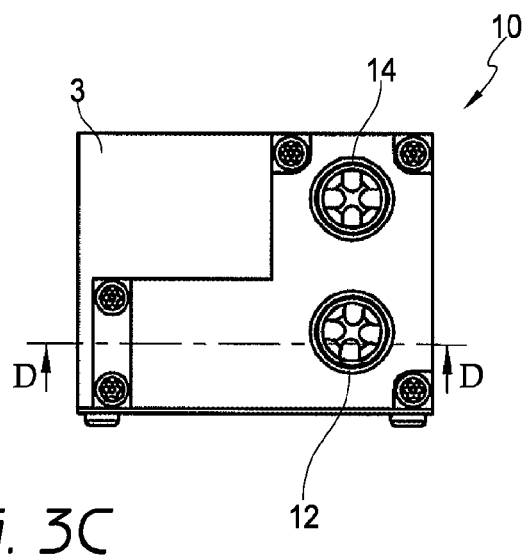
FIG. 3C is a front view of the heating source of FIG. 3A.
Figure 3D:
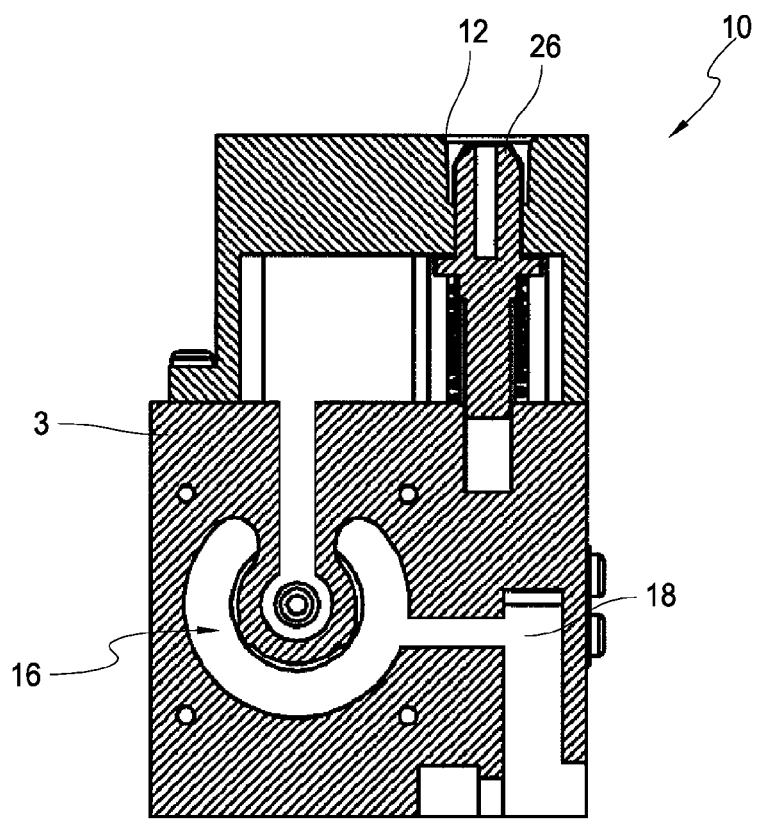
FIG. 3D is a cross-section of the heating source taken alone line A-A of FIG. 3C.

An embodiment of a fuel selector valve 3 is shown in FIG. 3A with a housing 11 and a cover 20. The cover has been removed in FIG. 3B revealing some of the internal components of the illustrated embodiment. A pressure regulator 16 is positioned within the housing such that fluid entering the fuel selector valve 3 via either the first or second fuel source connection 12, 14 can be directed to the pressure regulator 16. FIG. 3D shows a cross-section of the selector valve 3 showing the flow path between the fuel source connections and the pressure regulator. Fuel from the pressure regulator 16 can then flow to the outlet 18, as can also be seen with reference to FIG. 3D. The fuel can then flow to various other components, such as a burner. In some embodiments, the fuel selector valve 3 has two separate pressure regulators such that each fuel source connection directs fuel to a specific pressure regulator which can then travel to the outlet.

The fuel selector valve 3 can be configured to select one or more flow paths through the fuel selector valve 3 and/or to set a parameter of the fuel selector valve. For example, the fuel selector valve 3 can include one or more valves, where the position of the valve can determine one or more flow paths through the fuel selector valve 3, such as a fluid exit or entry pathway. As another example, the fuel selector valve 3 can control certain parameters of the pressure regulator 16.

Figure 4:
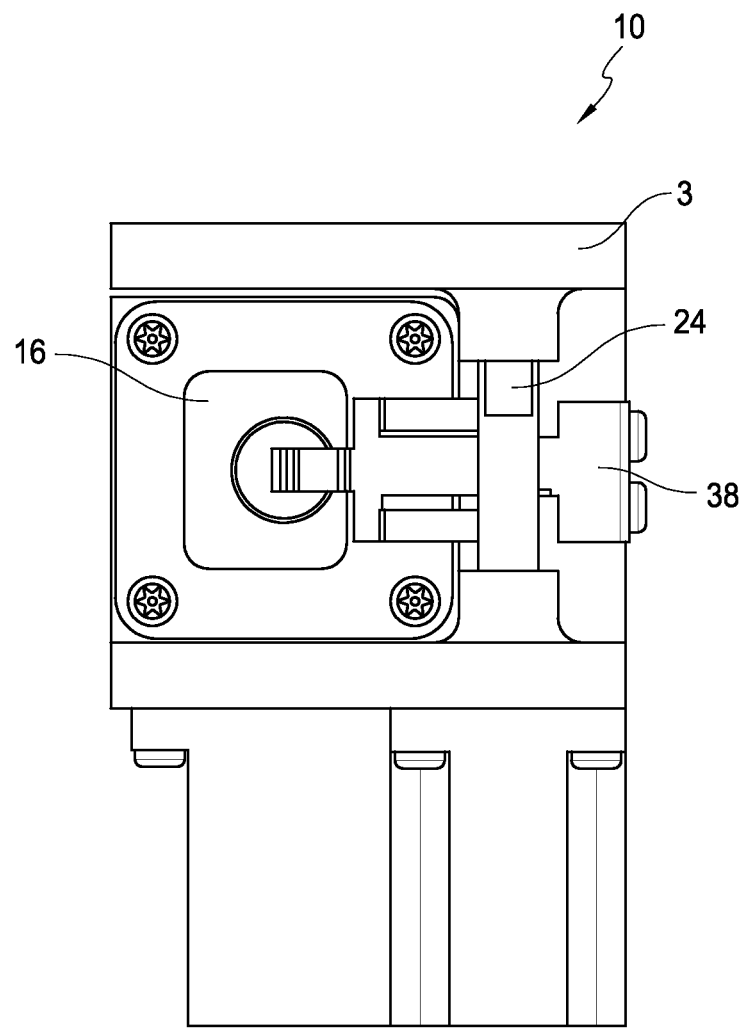
FIG. 4 is a top view of the partially disassembled heating source of FIG. 3B.
Figure 4A:
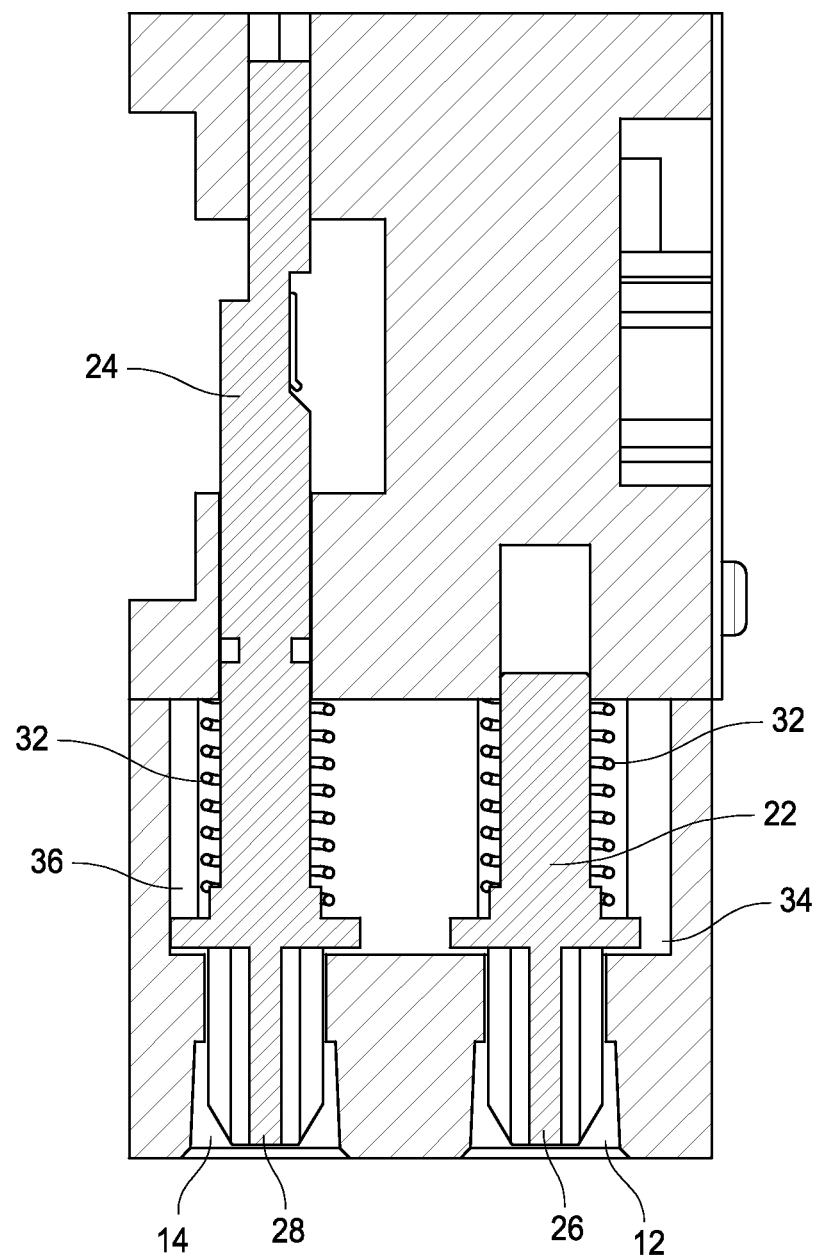
FIG. 4A is a cross-section of a heating source taken along line A-A of FIG. 4.

With reference to FIGS. 4-4A2, it can be seen that the fuel selector valve 3 can include one or more actuation members 22, 24. The actuation members 22, 24 can be used for many purposes such as to select one or more flow paths through the fuel selector valve 3 and/or to set a parameter of the fuel selector valve. The one or more actuation members can be provided in the fuel selector valve 3 in many ways. As shown, the actuation members are spring loaded rods that can be advanced in a linear motion. An actuation member can be one or more of a linkage, a rod, an electric or mechanical button, a pin, a slider, a gear, a cam, etc.

As shown, the actuation member 22 has an end 26 positioned within the first fuel source connection 12. A connector 30 can be attached to the first fuel source connection 12 by advancing the connector into the first fuel source connection 12. This can force the actuation member end 26 into the housing of the fuel selector valve 3. This force then counteracts a spring force provided by a spring 32 to open a valve 34.

FIG. 4A1 shows the open valve 34 with the connector 30 attached to the first fuel source connection 12. The connector 30 can be part of a fuel source to provide fuel to the heater assembly 10. With the valve 34 in the open position, fuel from the fuel source can flow through the connector 30 and into the fuel selector valve 3. In particular, as shown, fuel can flow into the first fuel source connection 12, then to the pressure regulator 16 and finally out of the fuel selector valve 3 by way of outlet 18 (FIG. 3A-3B).

Alternatively, the connector 30 can be connected to the second fuel source connection 14. This can open the valve 36 by pressing on the end 28 of the second actuation member 24. Fuel can then flow from the fuel source through the connector 30 into the fuel source connection 14. The fuel can then flow to the pressure regulator 16 and out through outlet 18.

The presence of two valves 34, 36, one at each fuel source connection 12, 14, can prevent fuel from exiting the fuel selector valve 3 undesirably, as well as preventing other undesirable materials from entering the fuel selector valve 3. In some embodiments, the fuel selector valve can utilize a cap or plug to block the unused fuel source connection. This may be in addition to or instead of one or more valves at the fuel source connections. For example, in some embodiments the actuation member 24 does not include a valve at the fuel source connection 14.

In addition to or instead of providing a valve 36 at the inlet or fuel source connection 14, the actuation member 24 can be in a position to control a parameter of the pressure regulator 16. Referring back to FIGS. 3B and 4, it can be seen that an arm 38 extends between the actuation member 24 and the pressure regulator 16. The actuation member 24 can act on the arm, determining the position of the arm 38. This position can be seen by comparing the position of the arm 38 in FIGS. 4A1 and 4A2, as well as 4B1 and 4B2. The position of the arm 38 can then determine the height ($H_1$, $H_3$) of the spring 40 within the pressure regulator. That is, though the length of the spring is constant, the height $H_1$ of the spring when the diaphragm is in a first position shown in FIG. 4B1 is greater than the height $H_3$ of the spring when the spring is in the position shown in FIG. 4B2. As shown, the arm 38 contacts a cap 41 that is connected to the spring 40. The height of the spring 40 can be a factor in determining the force required to move the diaphragm 42. The spring height can be used to preset the pressure settings of the pressure regulator. Thus, the spring can be tensioned to regulate the pressure of the incoming fuel depending on whether the first or second fuel source is utilized.

In another embodiment, the actuation member contacts the pressure regulator 16 directly, such as at the cap 41, without the assistance of an arm or other device to set the regulating pressure of the pressure regulator.

The pressure regulator 16 can be set to a first position as shown in FIG. 4B1. The initial position can allow for flow control of the first fuel at an initial predetermined pressure or pressure range. The initial predetermined pressure or pressure range is lower than the second predetermined pressure or pressure range based on the second position as shown in FIG. 4B2. For example, the predetermined selected pressure can depend at least in part on the particular fuel used, and may desirably provide for safe and efficient fuel combustion and reduce, mitigate, or minimize undesirable emissions and pollution. In some embodiments, the first pressure can be set to be within the range of about 3 inches of water column to about 6 inches of water column, including all values and sub-ranges therebetween. In some embodiments, the threshold or flow-terminating pressure is about 3 inches of water column, about 4 inches of water column, about 5 inches of water column, or about 6 inches of water column.

In some embodiments, the second pressure can be set to be within the range of about 8 inches of water column to about 12 inches of water column, including all values and sub-ranges therebetween. In some embodiments, the second threshold or flow-terminating pressure is about equal to 8 inches of water column, about 9 inches of water column, about 10 inches of water column, about 11 inches of water column, or about 12 inches of water column.

When natural gas is the first fuel and propane is the second fuel, the first pressure, pressure range and threshold pressure are less than the second pressure, pressure range and threshold pressure. Stated differently, in some embodiments, when natural gas is the first fuel and propane is the second fuel, the second pressure, pressure range and threshold pressure are greater than the first pressure, pressure range and threshold pressure.

The pressure regulator 16 can function in a similar manner to that discussed in U.S. application Ser. No. 11/443,484, filed May 30, 2006, now U.S. Pat. No. 7,607,426, incorporated herein by reference and made a part of this specification; with particular reference to the discussion on pressure regulators at columns 3-9 and FIGS. 3-7 of the issued patent.

The pressure settings can be further adjusted by tensioning of a screw or other device 41 that allows for flow control of the fuel at a predetermined pressure or pressure range and selectively maintains an orifice open so that the fuel can flow through spring-loaded valve or valve assembly of the pressure regulator. If the pressure exceeds a threshold pressure, a plunger seat 43 can be pushed towards a seal ring 45 to seal off the orifice, thereby closing the pressure regulator.

The fuel selector valve 3 can permit the flow of fuel from one or more pressure regulators, through the fuel selector valve 3 and into additional components. The additional components can be, for example, the heater control valve 130, the fluid flow controller 140, the nozzle 160, etc. In some embodiments, the additional components can comprise a control valve which comprises at least one of a manual valve, a thermostat valve, an AC solenoid, a DC solenoid and a flame adjustment motor. In various embodiments, the additional components may or may not comprise part of the heating source 10. The additional components can be configured to use the fuel, such as for combustion, and/or to direct one or more lines of fuel to other uses or areas of the heater 100 or other appliance.

Returning now to FIGS. 4A1-4B2, the functioning of the arm 38 and the actuation member 24 will be described in more detail. The actuation member 24 can have a varying or undulating surface that engages the arm 38. The arm 38 can move with the varying surface thereby changing the position of the arm 38. The arm 38 can be made from a resilient flexible material, such as metal or plastic, but can also be rigid. The arm as shown is a flexible material that can be moved and bent between positions with a resiliency to return to an unbent or less bent position. In other embodiments, the arm can be a linkage, a pinned rotating arm, a member suspended between the actuation member and the pressure regulator, etc. The arm 38 can be elongate, have spring qualities, be biased upwards, be a bent metal arm or beam, etc.

The actuation member 24 can have sections of different heights ($H_2$, $H_4$). For example, the actuation member 24 can include flat spots or sections with a diameter different than adjacent sections. As can be seen, the actuation member includes a flat portion 44 with a transition portion 46 that extends between the initial outer diameter of the cylindrical rod and the flat portion 44. Alternatively, the portion 44 can have smaller diameter than the initial outer diameter of the rod. The rod can extend along a longitudinal axis and have a plurality of longitudinal cross-sections of different shapes. The actuation member 24 can be a type of cam and can also be shapes, besides cylindrical, and can have a surface that varies to provide different heights to the arm 38 for engaging the arm and setting the pressure at the pressure regulator 16.

Figure 5A:
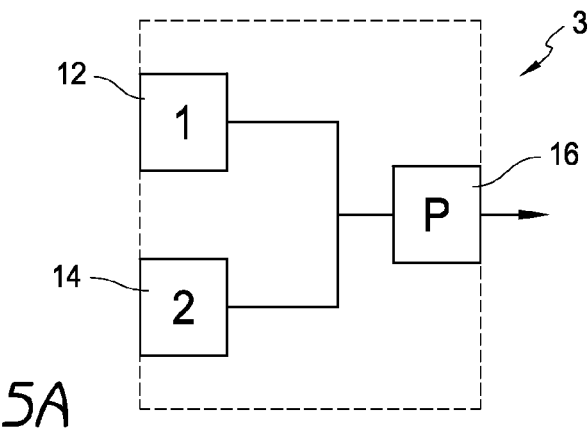
FIGS. 5A-C are schematic views of different embodiments of heating sources.

Looking now to FIG. 5A, a schematic diagram of a heating source with a fuel selector valve 3 is illustrated. The illustrated fuel selector valve 3 can be similar to that described above with reference to FIGS. 3A-4B2. A fuel source can be connected to the fuel selector valve 3 via one of the fuel source connections 12, 14. The act of connecting the fuel source to the fuel selector valve 3 can set the pressure regulator to the desired pressure if it is not already at the desired pressure. Thus, selecting the proper fuel source connection can determine and sometimes set the pressure at the pressure regulator. It will be understood that one fuel source connection may allow fluid to flow through a default or preset path while the other fuel source connection may change the path including changing other characteristics of the system along the path such as the pressure regulator setting. In some embodiments, both fuel source connections may change the path and/or other characteristics.

The fuel selector valve 3 can permit the flow of fuel from the pressure regulator 16 through the fuel selector valve 3 and then into additional components. The additional components can be, for example, the heater control valve 130, the fluid flow controller 140, the nozzle 160, etc. In some embodiments, the additional components can comprise a control valve which comprises at least one of a manual valve, a thermostat valve, an AC solenoid, a DC solenoid and a flame adjustment motor. In various embodiments, the additional components may or may not comprise part of the heating source 10. The additional components can be configured to use the fuel, such as for combustion, and/or to direct one or more lines of fuel to other uses or areas of the heater 100 or other appliance.

Figure 5B:
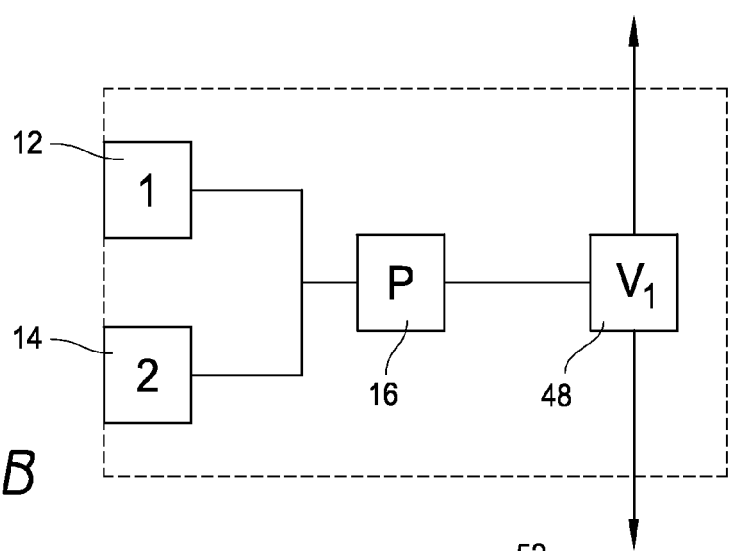
Figure 5C:
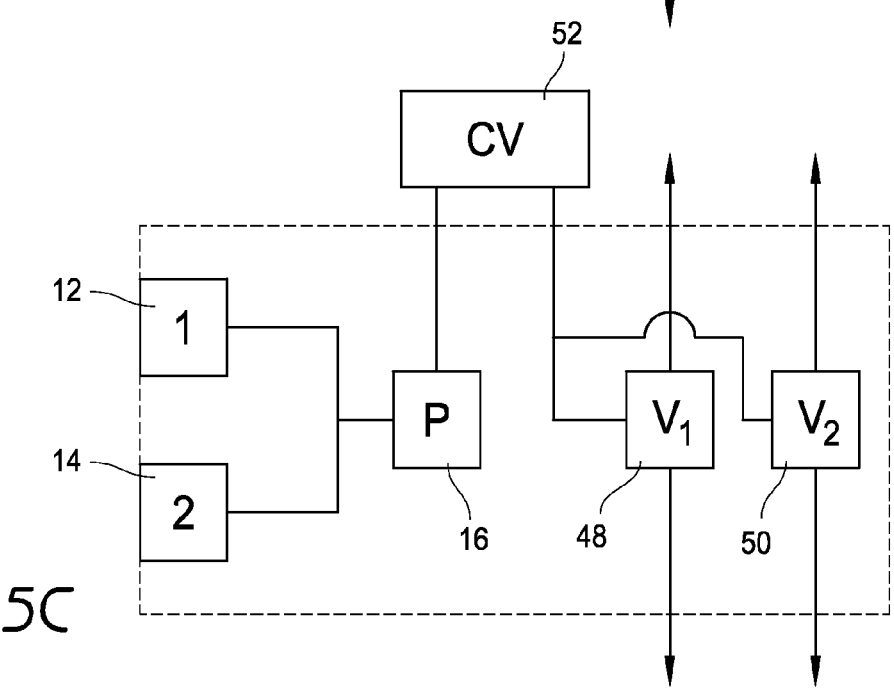

FIGS. 5B and 5C show additional embodiments of heating source where selecting the fuel source connection can set additional parameters. The fuel selector valve of FIG. 5B includes a valve 48. The valve 48 has one inlet and two outlets, such that one outlet can be closed while the other is open. The valve 48 can have an initial position where one of the outlets is open and a secondary position where the other outlet is open. The selection of the fuel source connection can determine whether the valve is in the initial or secondary position. For example, selecting the first fuel source connection 12 can allow fuel flow through the initial configuration of the heating source, while selecting the second fuel source connection 14 can move the pressure regulator 16 and the valve 48 to their secondary configurations.

In other embodiments, the two outlets can both have separate open and closed positions with separate valves located at each outlet. Thus, the valve 48 can comprise two valves. The selection of the fuel source connection can determine which valve is opened. For example, selecting the first fuel source connection 12 can allow fuel flow through the initial configuration of the pressure regulator and can open the first valve at one of the outlets. Selecting the second fuel source connection 14 can move the pressure regulator 16 to its secondary configuration and open the second valve at the other of the outlets.

FIG. 5C illustrates a fuel selector valve having two valves 48, 50. In addition to setting the pressure regulator, selecting the fuel source connection can also determine how the fuel flows through the valves 48, 50. For example, one selection can allow the fuel to follow the upward arrows, while the other selection can allow the fuel to follow the downward arrows. In addition, the fuel selector valve can also direct the fuel out of the fuel selector valve after the pressure regulator 16, and then receive the fuel again. The fuel can be directed to other components 52 that then direct the fuel, or some of the fuel back to the fuel selector valve. It should be understood that the fuel selector valve show in FIG. 5B can also include other components 52 between the pressure regulator 16 and the valve 48. The heating source can include the fuel selector valve and one or more of the other components.

The other component 52 can preferably be a control valve. In some embodiments, the control valve can comprise at least one of a manual valve, a thermostat valve, an AC solenoid, a DC solenoid and a flame adjustment motor. For example the control valve 52 can include two solenoids. Each solenoid can control the flow of fuel to one of the valves 48, 50. The valves can then direct fuel to additional components such as a pilot light or oxygen depletion sensor and to a nozzle. In some embodiments, each line leaving the valve can be configured to direct a particular type of fuel to a component configured specific to that type of fuel. For example, one valve may have two lines with each line connected to a different nozzle. The two nozzles can each have a different sized orifice and/or air hole and each can be configured for a particular fuel type.

Figure 6A:
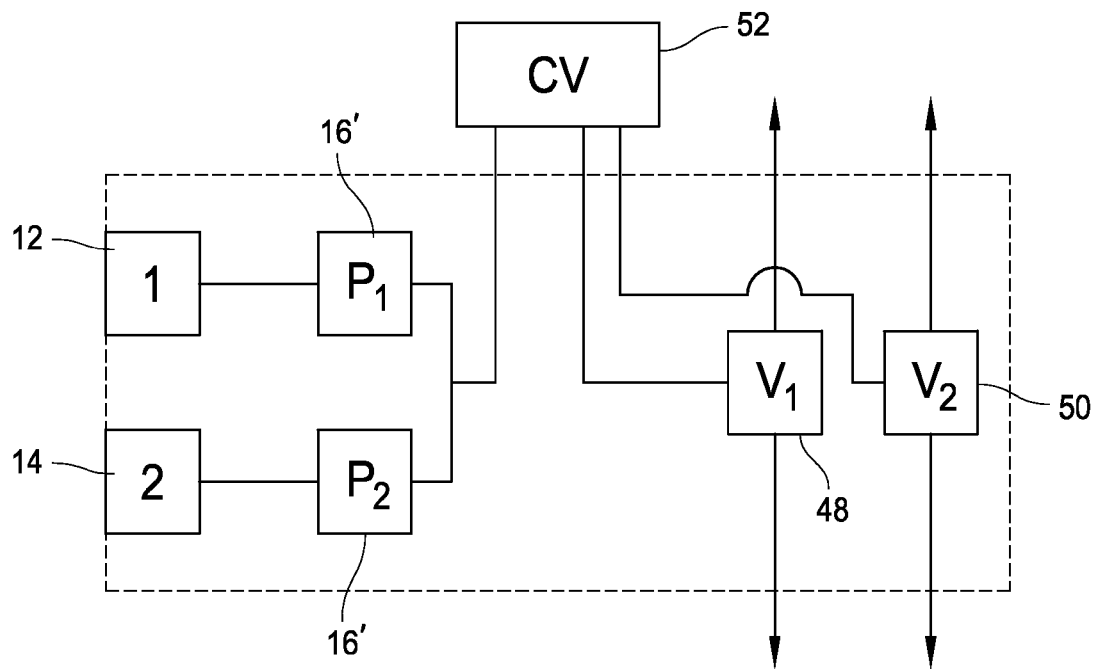
FIGS. 6A-B are schematic views of different embodiments of heating sources.
Figure 6B:
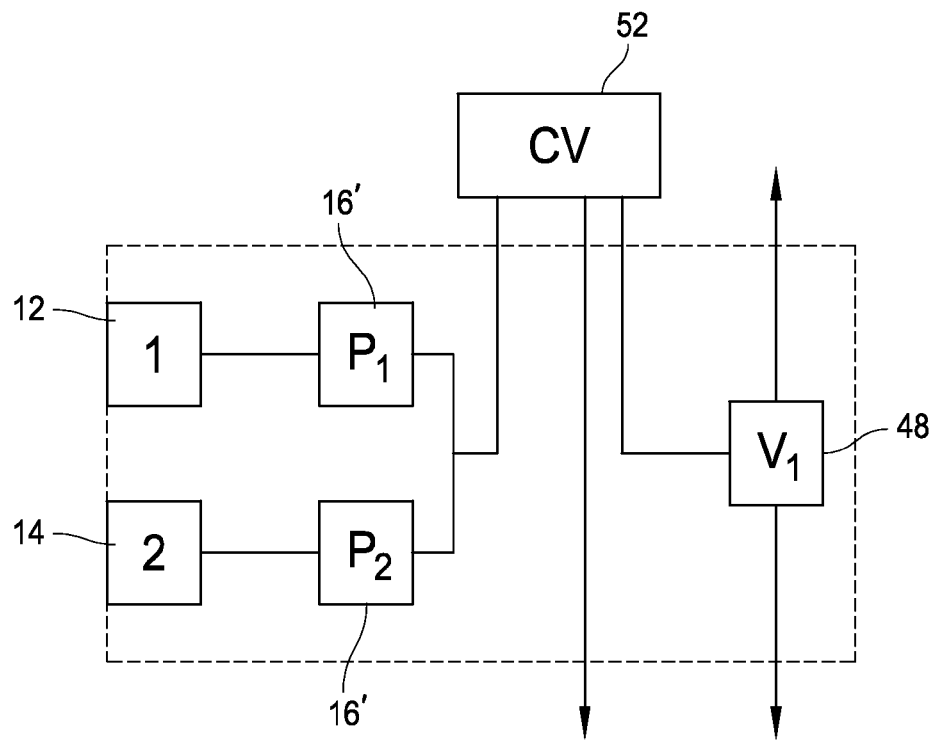

Turning now to FIGS. 6A and 6B, additional embodiments of heating sources are shown. The heating source of FIG. 6A is very similar to that shown in FIG. 5C. One difference is that the fuel selector valve of FIG. 6A includes two pressure regulators 16'. The two pressure regulators 16' can be preset to a particular pressure or pressure range. As there is only one line leading to each pressure regulator, the pressure regulators do not need to be changeable between two different pressures as discussed above with reference to FIGS. 5A-5C. In addition, similar to FIGS. 5B and 5C, either one of the fuel source connections 12, 14 or both can determine and/or change a path through the fuel selector valve. For example, each of valves 48 and 50 can comprise one valve or two valves as described above.

FIG. 6B shows another embodiment where the control valve 52 returns two flows of fuel to the fuel selector valve. One flow of fuel is directed to a valve 48 and one flow passes through the fuel selector valve but does not have separate paths dependent on the fuel type.

In each of the embodiments shown in FIGS. 5A-6B, the fuel selector valve may also include valves in or near the fuel source connections 12, 14. This can help to control the flow of fuel into the fuel selector valve as has been previously discussed.

Turning now to FIGS. 7-9C, another embodiment of heating source 10 is shown. It will be understood that parts of this heating source can function in a similar manner to the heating source shown and described with reference to FIGS. 3A-4B2. Thus, similar reference numbers are used. For example, the pressure regulator 16 functions in the same way in both illustrated embodiments. In addition, the embodiment of FIGS. 7-9C is conceptually similar to the schematic diagram shown and described with reference to FIG. 5C.

Figure 7:
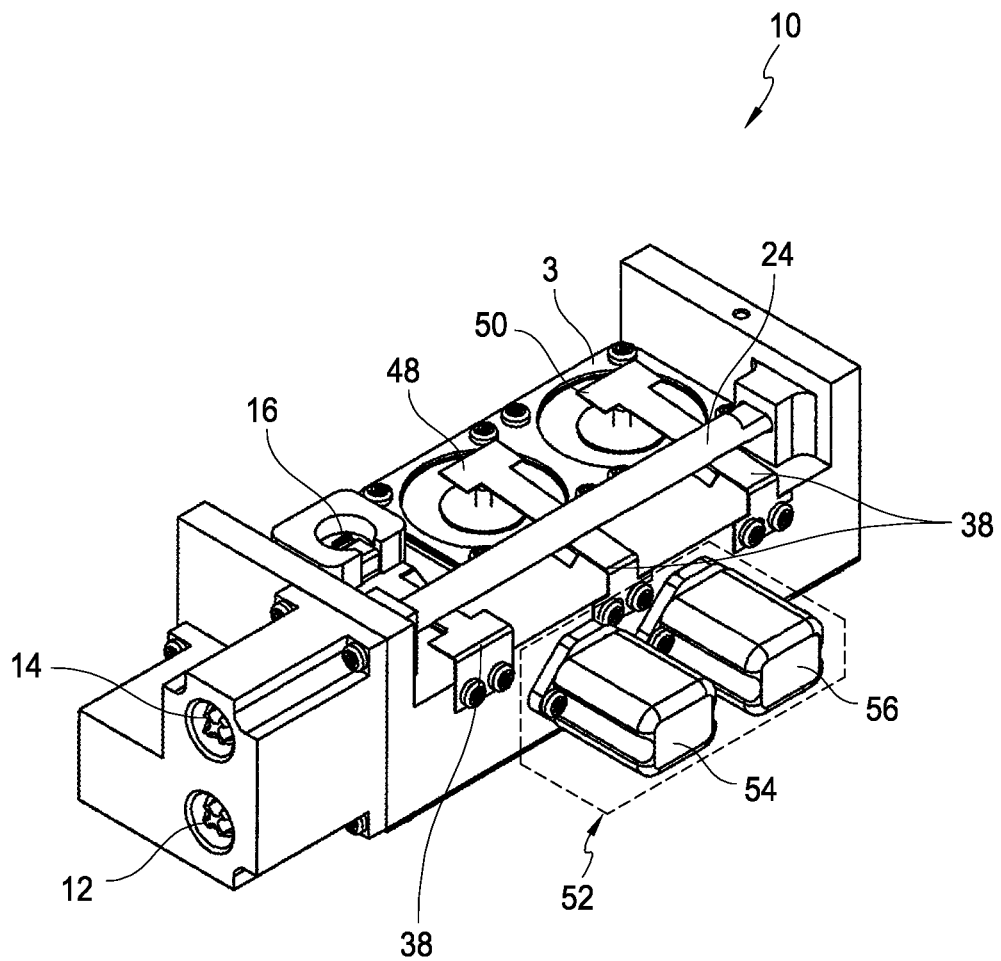
FIG. 7 is a perspective view of another embodiment of a partially disassembled heating source.
Figure 8:
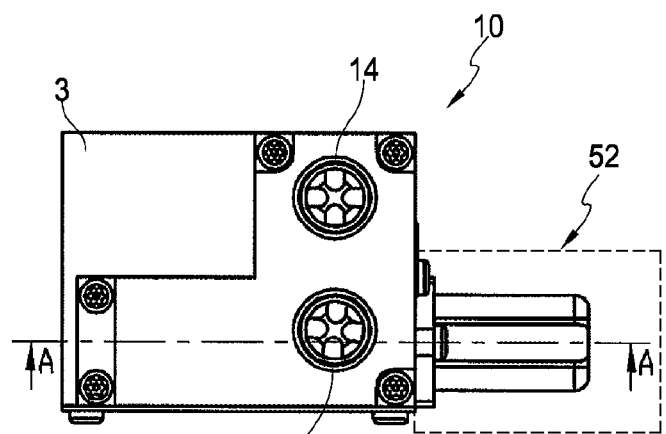
FIG. 8 is a front view of the heating source of FIG. 7.
Figure 8A:
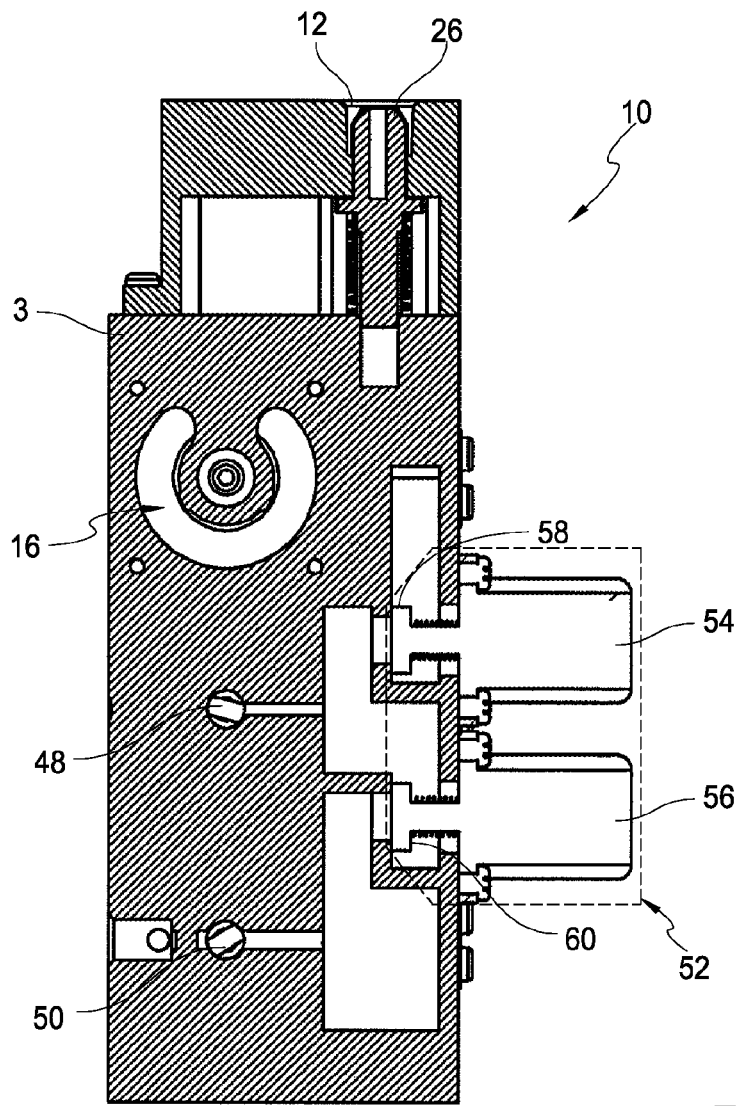
FIG. 8A is a cross-sectional view of the heating source of FIG. 8 taken along line A-A.

Looking to FIG. 7, it can be seen that a control valve 52 having two solenoids 54, 56 is connected to the side of the fuel selector valve 3. The fuel selector valve also includes two valves 48, 50. FIGS. 8 and 8A show the fuel selector valve 3 in relation to the control valve 52. A fluid, such as fuel, can flow from one of the fuel source connections 12, 14 flows through the pressure regulator 16 to the control valve 52. The fluid flow will first encounter the first solenoid 54. The first solenoid 54 has a valve 58 that can control flow past the first solenoid 54. When the valve 58 is open, fluid can flow to both the second solenoid 56 and to the valve 48. The second solenoid 56 also has a valve 60 which can open or close to control fuel flow to the valve 50. In some embodiments, the valve 48 directs fuel to a pilot light or oxygen depletion sensor and the valve 50 directs fuel to a nozzle at a burner. Thus, it may be desirable direct fuel to be ignited at the pilot light first, before igniting or directing fuel to the burner. The control valve 52 can also control the amount of fuel flowing to burner. In some embodiments, the control valve can also include a manual valve that allows for manual as well as, or instead of, automatic control by an electric valve, such as the two solenoids shown.

As discussed, selecting one of the first and second fuel source connections 12, 14 can determine the flow path through the heating source. In particular, the actuation member 24 can move the valves 48 and 50 from an initial position to a secondary position in a manner similar to that described above with reference to the pressure regulator.

The fuel selector valve 3 can be used for selecting between two different fuels and for setting certain parameters, such as one or more flow paths, and/or a setting on one or more pressure regulators based on the desired and selected fuel. The fuel selector valve 3 can have a first mode configured to direct a flow of a first fuel (such as NG) in a first path through the fuel selector valve 3 and a second mode configured to direct a flow of a second fuel (such as LP) in a second path through the fuel selector valve 3.

The fuel selector valve 3 can further comprise first and second fuel source connections or hook-ups 12, 14. The fuel selector valve 3 can connect to one of two different fuel sources, each fuel source having a different type of fuel therein.

A pressure regulator 16 is positioned within the housing such that fluid entering the fuel selector valve 3 via either the first or second fuel source connection 12, 14 can be directed to the pressure regulator 16. Fuel from the pressure regulator 16 can then flow to the control valve 52 as discussed above. In some embodiments, the fuel selector valve 3 has two separate pressure regulators such that each fuel source connection directs fuel to a specific pressure regulator.

The fuel selector valve 3 can be configured to select one or more flow paths through the fuel selector valve 3 and/or to set a parameter of the fuel selector valve. For example, the fuel selector valve 3 may include two valves 48, 50, where the position of the valve can determine a flow path through the fuel selector valve 3. The fuel selector valve 3 can also control certain parameters of the pressure regulator 16.

Figure 9:
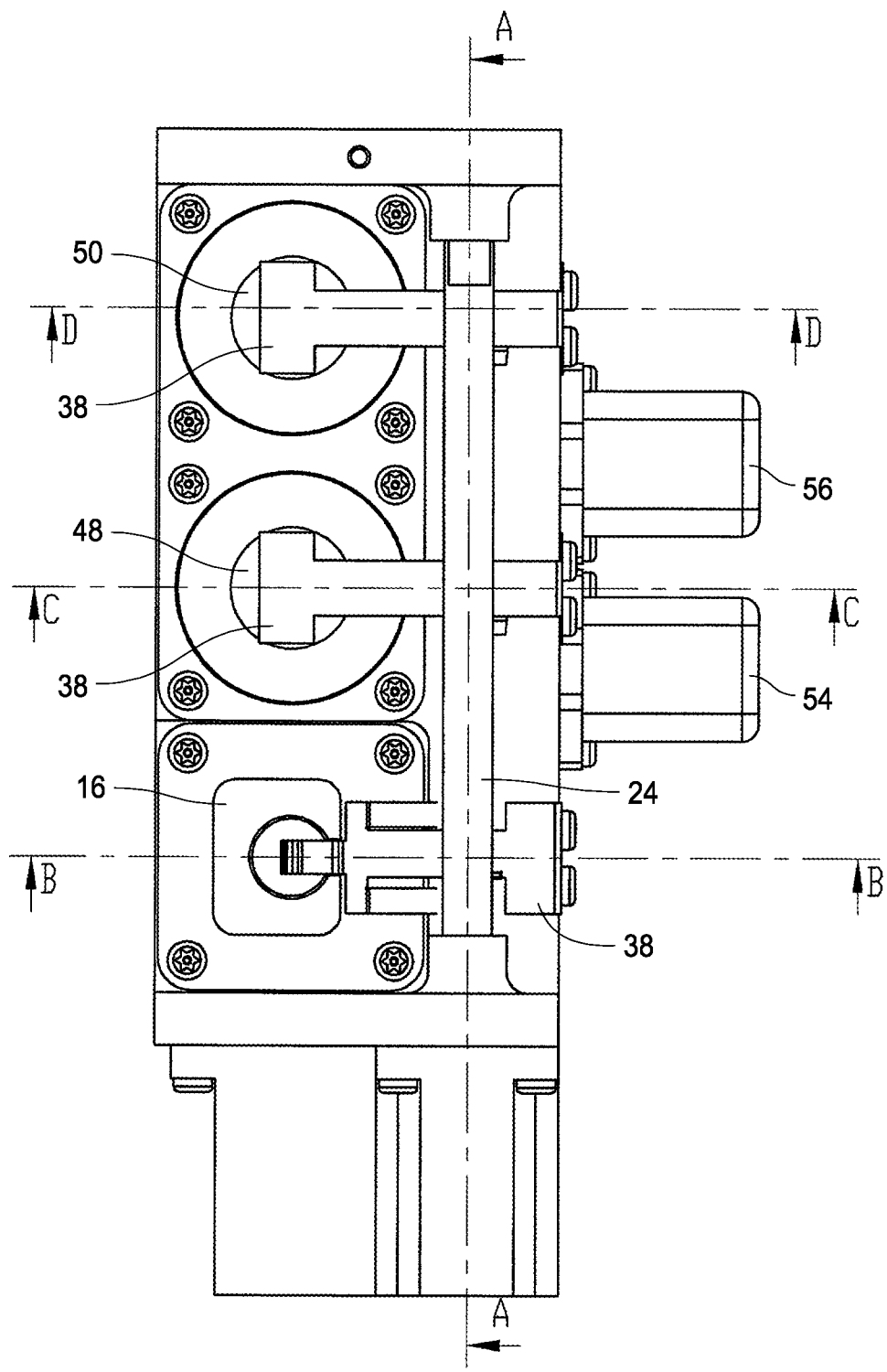
FIG. 9 is a top view of the partially disassembled heating source of FIG. 7.
Figure 9A:
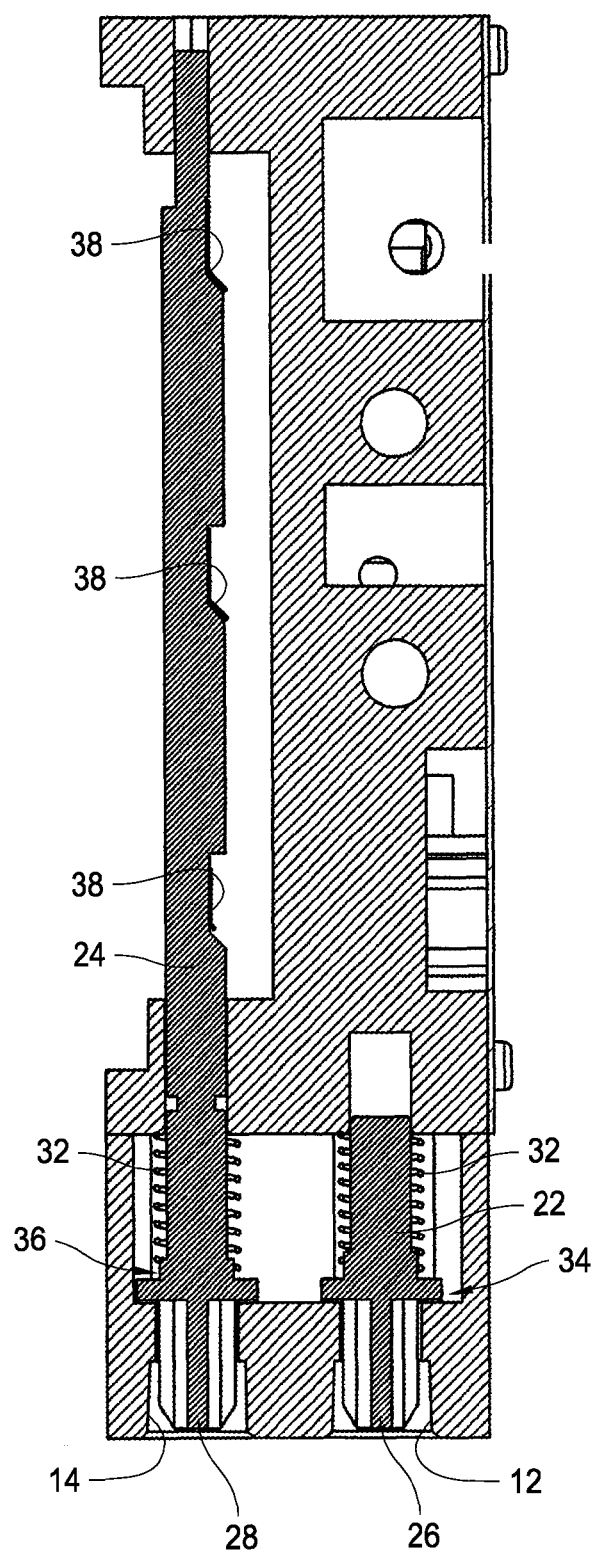
FIG. 9A is a cross-section of a heating source taken along line A-A of FIG. 9.

With reference to FIGS. 9-9A2, it can be seen that the fuel selector valve 3 can include one or more actuation members 22, 24. The actuation members 22, 24 can be used for many purposes such as to select one or more flow paths through the fuel selector valve 3 and/or to set a parameter of the fuel selector valve. As shown, the actuation members are spring loaded rods that can be advanced in a linear motion.

The illustrated actuation member 22 has an end 26 positioned within the first fuel source connection 12. A connector 30 can be attached to the first fuel source connection 12 by advancing the connector into the first fuel source connection 12. This can force the actuation member end 26 into the housing of the fuel selector valve 3. This force then counteracts a spring force provided by a spring 32 to open a valve 34.

FIG. 9A1 shows the open valve 34 with the connector 30 attached to the first fuel source connection 12. The connector 30 can be part of a fuel source to provide fuel to the heater assembly 10. With the valve 34 in the open position, fuel from the fuel source can flow into the first fuel source connection 12, to the pressure regulator 16, then to the control valve 52 and then to one or both of the valves 48, 50 before finally leaving the fuel selector valve 3.

Alternatively, the connector 30 can be connected to the second fuel source connection 14 as shown in FIG. 9A2. This can open the valve 36 by pressing on the end 28 of the second actuation member 24. Fuel can then flow from the fuel source through the connector 30 into the fuel selector valve 3 and through the fuel selector valve 3 in the same manner as mentioned above.

The presence of two valves 34, 36, one at each fuel source connection 12, 14, can prevent fuel from exiting the fuel selector valve 3 undesirably, as well as preventing other undesirable materials from entering the fuel selector valve 3. In some embodiments, the fuel selector valve can utilize a cap or plug to block the unused fuel source connection. This may be in addition to or instead of one or more valves at the fuel source connections. For example, in some embodiments the actuation member 24 does not include a valve at the fuel source connection 14.

In addition to, or instead of, providing a valve 36 at the inlet or fuel source connection 14, the actuation member 24 can be in a position to control a parameter of the pressure regulator 16, such as by an arm 38 that extends between the actuation member 24 and the pressure regulator 16. The actuation member 24 can act on the arm, determining the position of the arm 38. The position of the arm 38 can then determine the height of the spring 40 within the pressure regulator. The height of the spring 40 can be a factor in determining the force required to move the diaphragm 42. The spring height can be used to set the pressure of the fluid flowing through the pressure regulator.

In addition to controlling the pressure regulator, the actuation member 24 can also control one or more valves, including valves 48, 50. The actuation member 24 can have a varying or undulating surface that engages the arms 38 as shown in FIGS. 9A1-9A2. The arms 38 can move with the varying surface thereby changing the position of the arms 38.

The actuation member 24 can include flat spots or sections with a diameter different than adjacent sections. As can be seen, the actuation member includes flat portions 44 with transition portions 46 that extend between the initial outer diameter of the cylindrical rod and the flat portions 44. Alternatively, the portion 44 can have a smaller diameter than the initial outer diameter of the rod. The rod can extend along a longitudinal axis and have a plurality of longitudinal cross-sections of different shapes. The actuation member 24 can be a type of cam and can also be shapes, besides cylindrical, and can have a surface that varies to provide different heights to the arms 38 for engaging the arms.

Figure 9B:
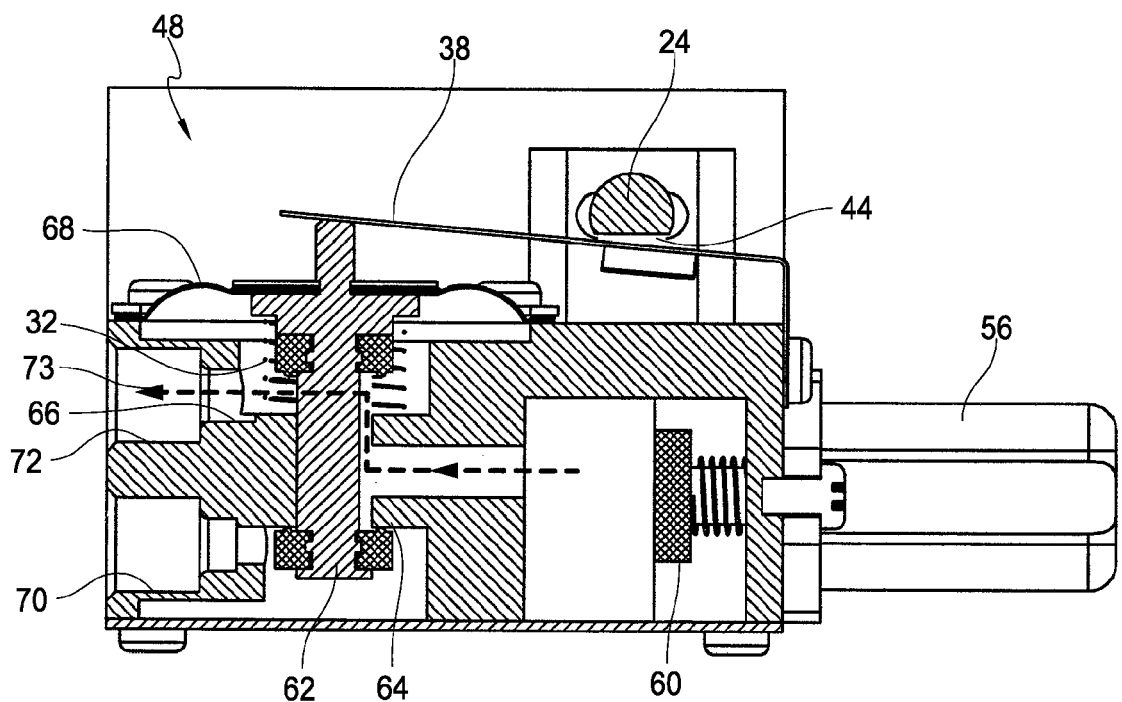
FIGS. 9B and 9C are cross-sections of the heating source of FIG. 9A taken along line C-C in two different positions.
Figure 9C:
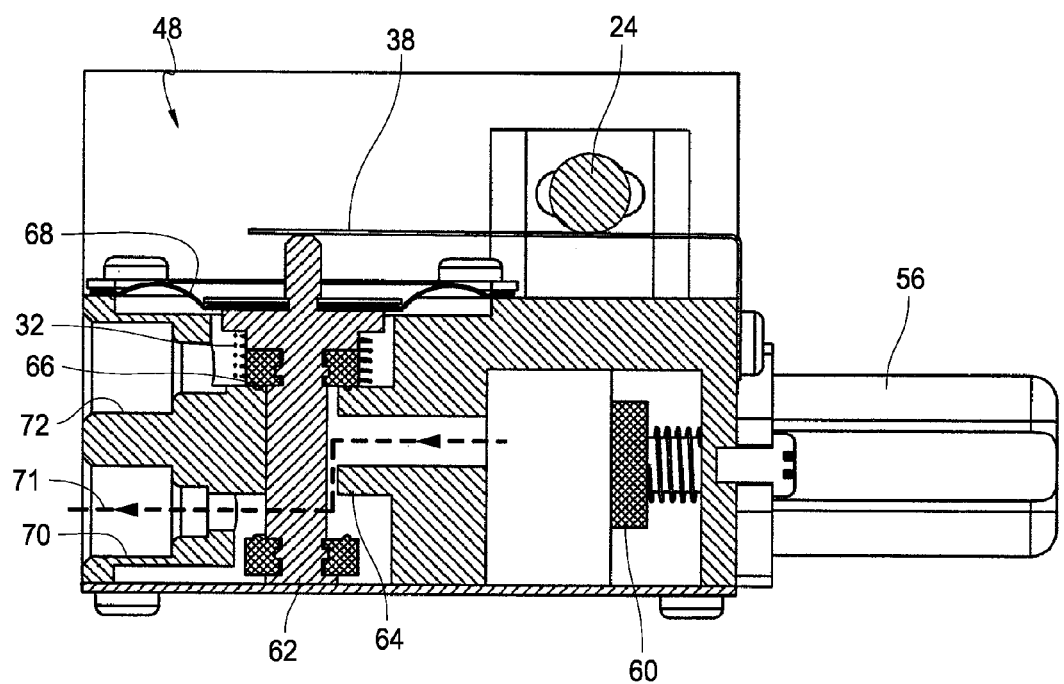

Looking now to FIGS. 9B and 9C, an embodiment of a valve 48 is shown. The valve 50 can function in a similar manner to that as will be described with reference to valve 48. The valves can also function in other ways as will be understood by one of skill in the art.

Valve 48 is shown having a valve body 62 that can control the fluid flow path and whether the flow exits the valve 48 through one of two outlets 70, 72. The valve body 62 can be seated against one of two different ledges 64, 66 surrounding an opening to either open or close the pathway 71, 73 to the respective outlet 70, 72. Fluid can enter the valve, such as from the control valve 52 as indicated by the dotted line. The position of the valve body 62 within the valve 48 can then determine whether the fluid exits via the first outlet 70 or the second outlet 72.

The valve body 62 can have a spring 32 to bias the valve body towards a first position as shown in FIG. 9B. In the first position, the outlet 72 is open and outlet 70 is closed, thus fluid will flow through flow path 73. In the second position shown in FIG. 9C, the outlet 72 is closed and the outlet 70 is open, thus fluid will flow through flow path 71. The valve body 62 can be made of one or more materials. The valve body 62 may include a solid core with a rubber or other elastic material to form the valve seat with the respective first or second ledge 64, 66.

The valve body 62 can also engage the arm 38 so that the position of the valve body 62 is controlled by the actuation member 24. As mentioned with respect to the pressure regulator, in some embodiments, the actuation member 24 can contact the valve body directly, without the use of an arm 38. Also, the arm 38 can take any form to allow the actuation member to control the position of the valve body within the valve 48.

The valve 48 can also include a diaphragm 68. The diaphragm 68 can be different from the diaphragm 42 in the pressure regulator (FIGS. 4B1 and 4B2) in that the diaphragm 68 is generally not used for pressure regulation. The diaphragm 68 can be a sheet of a flexible material anchored at its periphery that is most often round in shape. It can serve as a flexible barrier that allows the valve to be actuated from the outside, while sealing the valve body 62 and keeping the contents, namely the fuel, within the fuel selector valve.

Figure 10:
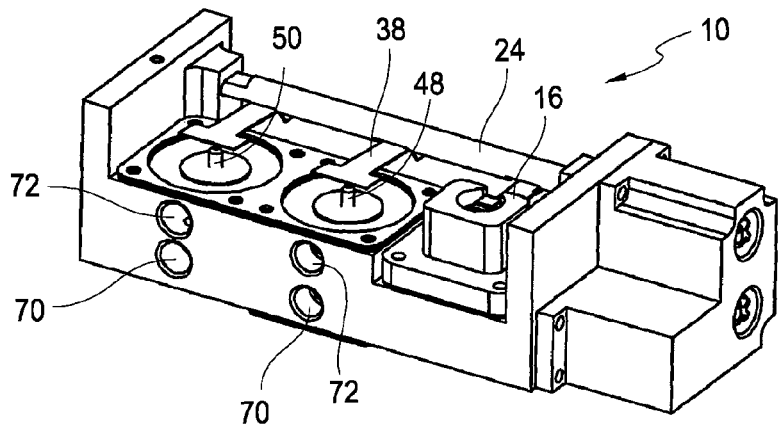
FIGS. 10, 10A, and 10B illustrate perspective views of different embodiments of heating sources.
Figure 10A:
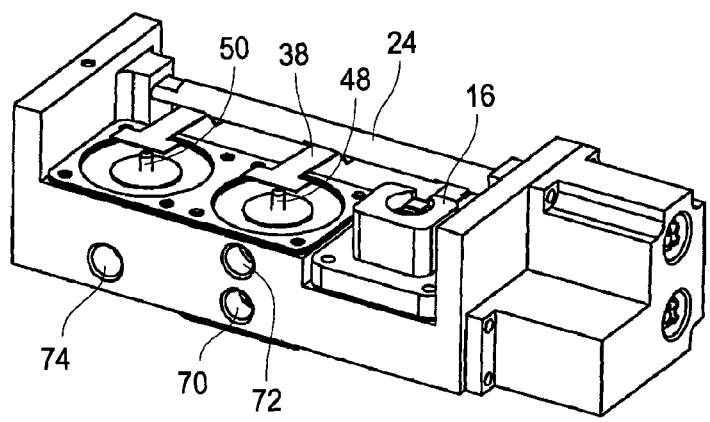
Figure 10B:
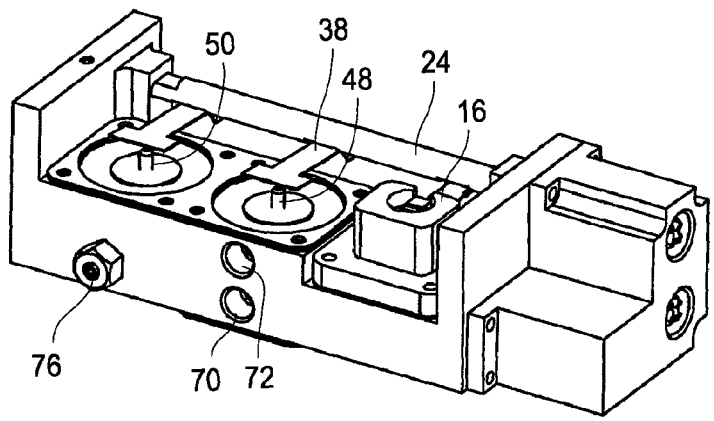

FIG. 10 illustrates a perspective view of the heating source 10 where both the first valve 48 and the second valve 50 have two outlets and function in similar manners. Thus, the heating source 10, valve 48 and valve 50 can all function in the same or a similar manner as that described with respect to FIGS. 7-9C. FIGS. 10A and 10B show heating sources where the first valve 48 is different from the second valve 50. The valve 48 can be the same or similar to that described above and the valve 50 can be the same or similar to the valves described in more detail below. Further, in some embodiments the heating source can include only one valve. The heating source may still include one or more outlets at the area that does not include a valve.

Figure 11A:
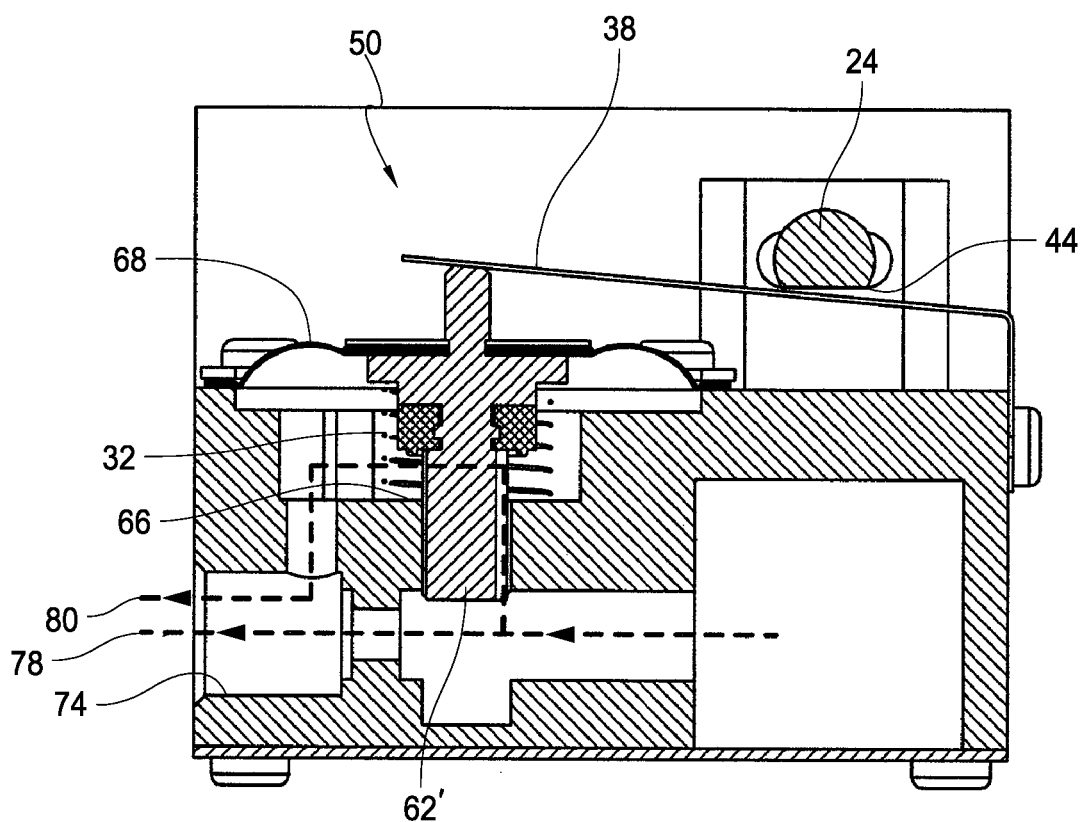
FIGS. 11A and 11B are cross-sections of a heating source in two different positions.
Figure 11B:
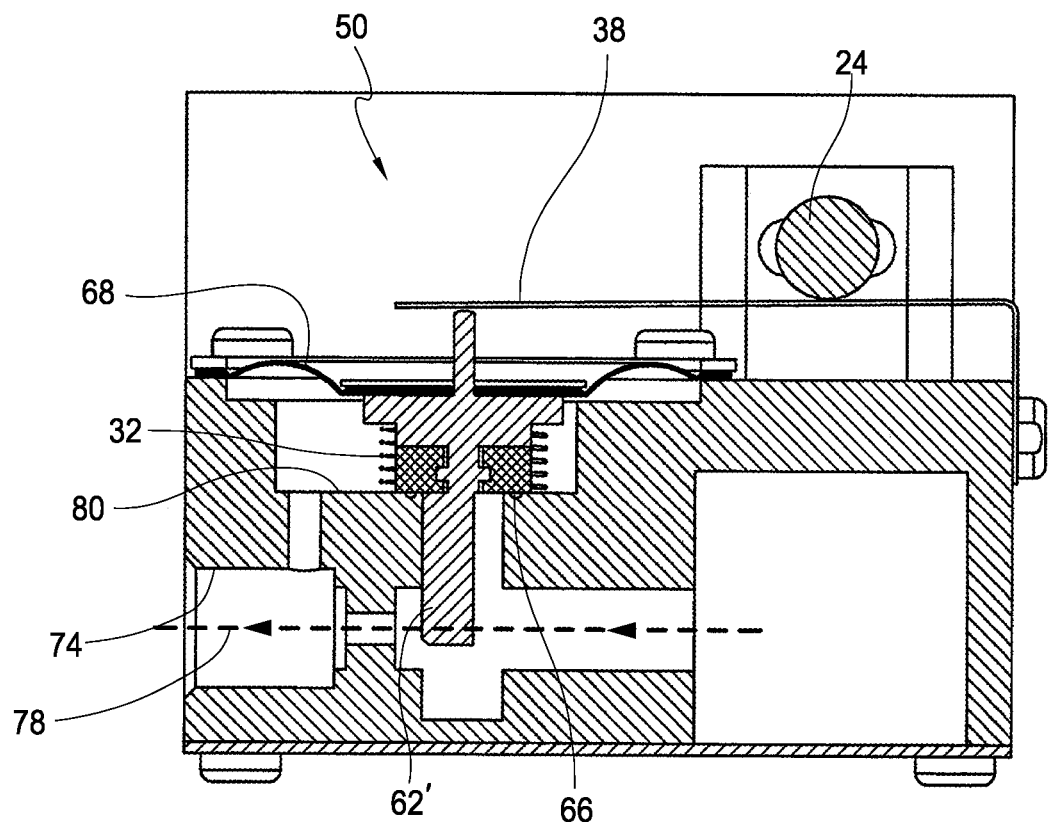

FIGS. 11A and 11B show an embodiment of a valve 50 in cross-section. As one example, the illustrated valve 50 could be used in the heating source of FIG. 10A. The valve 50 has two channels or flow paths 78, 80 and a valve body 62' that is positioned to open and close only one of the flow paths 80. Thus, the flow path 78 remains open so that when fuel is flowing from the control valve 52 to the valve 50, it will flow through flow path 78 and it may also flow through flow path

80. FIG. 11A shows the valve 50 with the valve body 62' spaced away from the ledge 66 so that the valve and the flow path 80 are open. FIG. 11B shows the valve body 62' seated at the ledge 66 so that the valve and the flow path 80 are closed. The flow path 78 remains open in both figures. There is also only one outlet 74 so both flow paths pass through the outlet 74.

Figure 12:
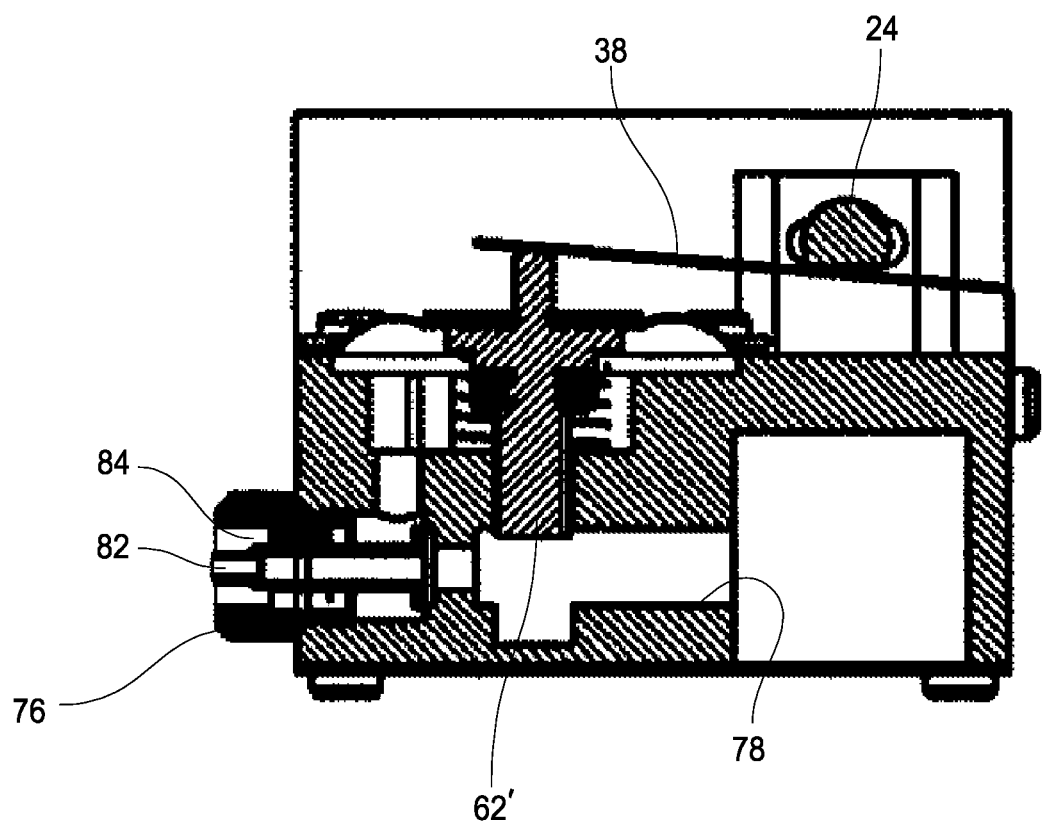
FIG. 12 is a cross-section of another heating source.

FIG. 12 shows the valve 50 of FIG. 11A with a nozzle assembly 76 positioned within the outlet 74. The nozzle assembly 76 has a center orifice 82 and an outer orifice 84. The flow path 78 is in fluid communication with the center orifice 82 and the flow path 80 is in fluid communication with the outer orifice 84. The orifices can be single orifices, or a plurality of orifices. For example, the nozzle can have a single center orifice 82 and a plurality of orifices that surround the center orifice to make up the outer orifice 84.

Figure 13:
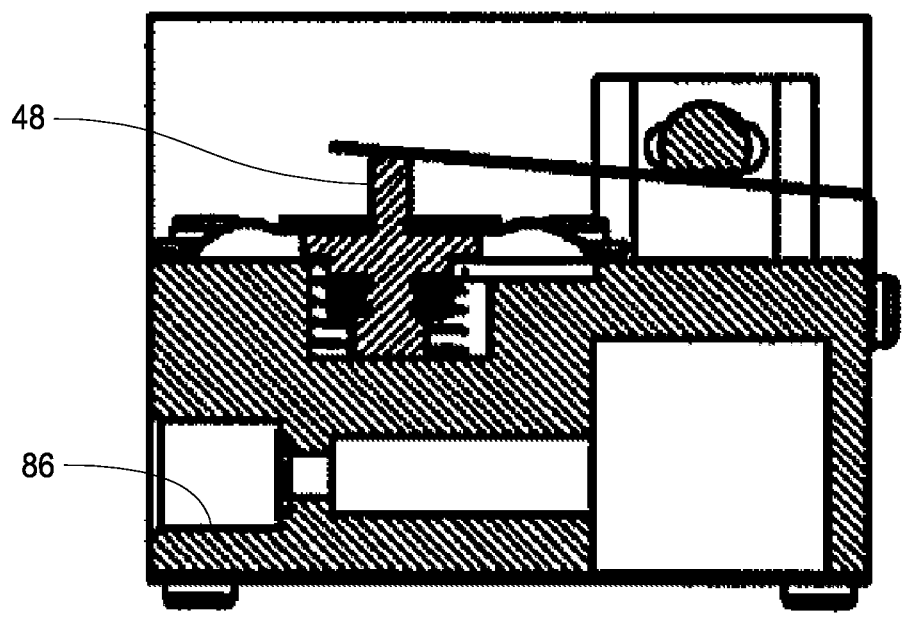
FIG. 13 is a cross-section of still another heating source.
Figure 14:
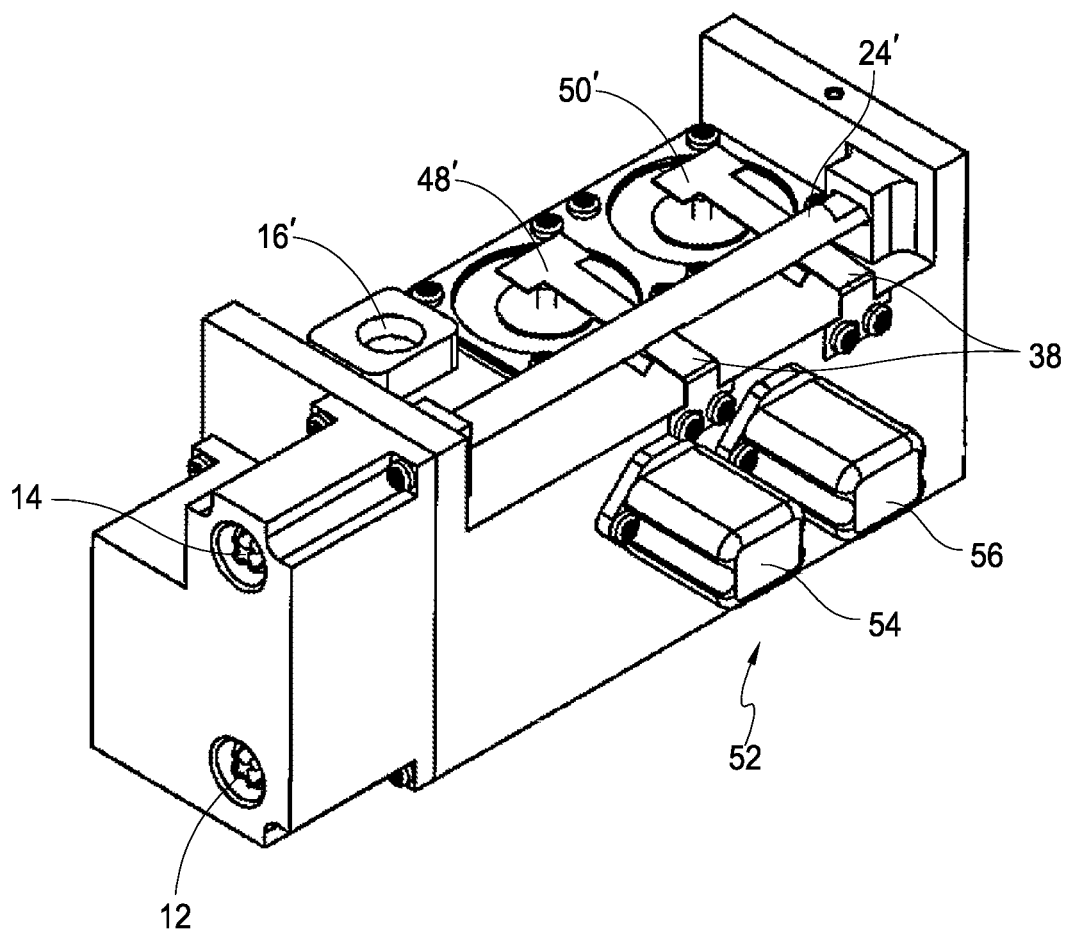
FIG. 14 shows a perspective view of another embodiment of a heating source.
Figure 15:
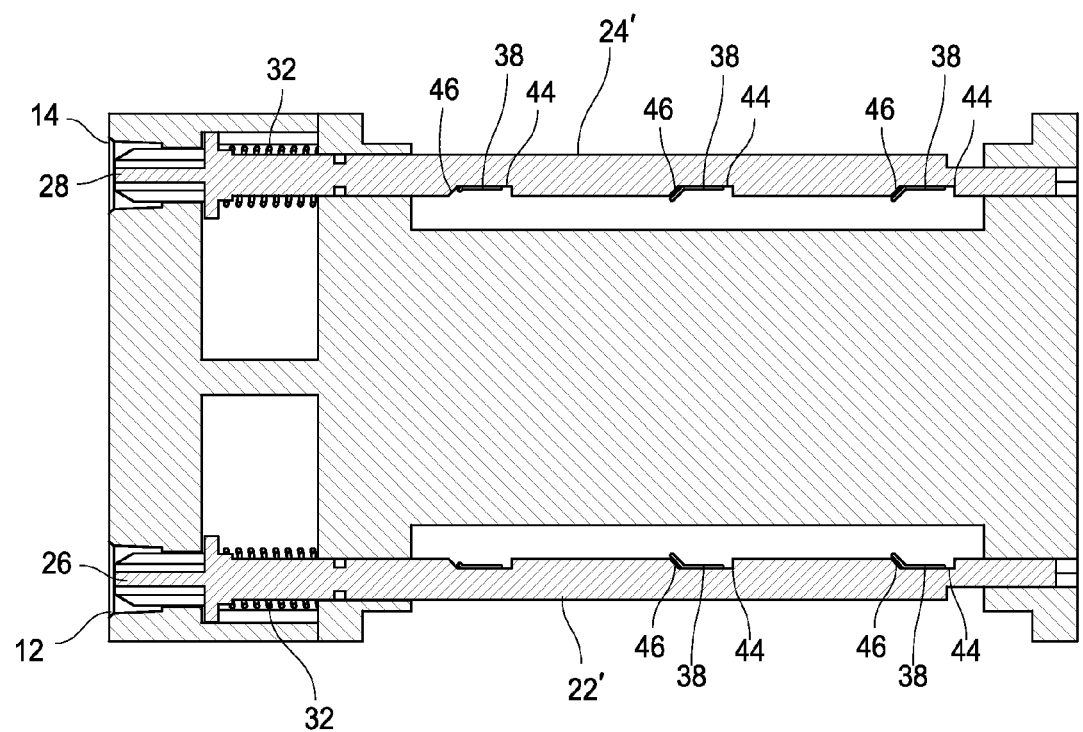
FIG. 15 is a cross-section of the heating source of FIG. 14.

FIG. 13 illustrates another embodiment of the fuel selector valve which is conceptually similar to the schematic diagram shown and described with reference to FIG. 6B. The fuel selector valve can have a valve 48 and then a separate flow path 86. Thus, a control valve 52 can return two flows of fuel to the fuel selector valve, one of which to the valve 48 and one to the flow path 86. The fuel in the flow path 86 can flow through the fuel selector valve without being controlled by have a valve 50 or without being directed down separate paths dependent on the fuel type. The fuel is simply directed out of the fuel selector valve.

Figure 16:
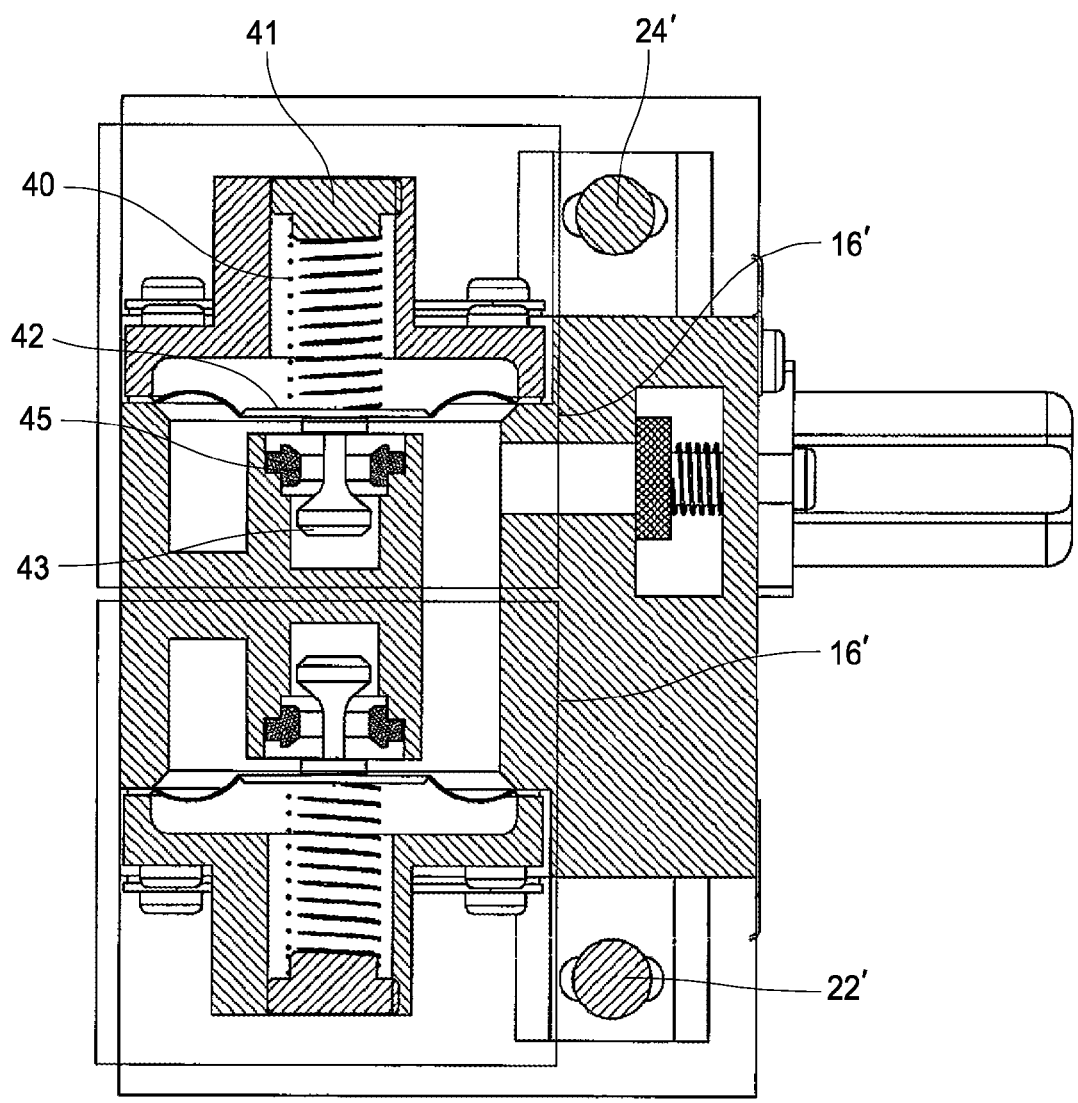
FIG. 16 is a cross-section of the heating source of FIG. 14 showing the pressure regulators.

Turning now to FIGS. 14-17, another embodiment of a heating source is shown which is conceptually similar to the schematic diagram shown and described with reference to FIG. 6A. As can best be seen in FIG. 15, both the first actuation member 22' and the second actuation member 24' are used to control valves at the inlets, but also the valves at the outlets of the fuel selector valve. In addition, the fuel selector valve includes two pressure regulators 16', 16" as can be seen in FIG. 16. The two pressure regulators 16', 16" can be preset to a particular pressure or pressure range and each of the fuel source connections 12, 14 can direct fluid flow to a specific pressure regulator. Thus, the pressure regulators do not need to be changeable between two different pressures as discussed previously.

The pressure settings of each pressure regulator 16', 16" can be independently adjusted by tensioning of a screw or other device 41 that allows for flow control of the fuel at a predetermined pressure or pressure range and selectively maintains an orifice open so that the fuel can flow through spring-loaded valve or valve assembly of the pressure regulator. If the pressure exceeds a threshold pressure, a plunger seat 43 can be pushed towards a seal ring 45 to seal off the orifice, thereby closing the pressure regulator.

Figure 17:
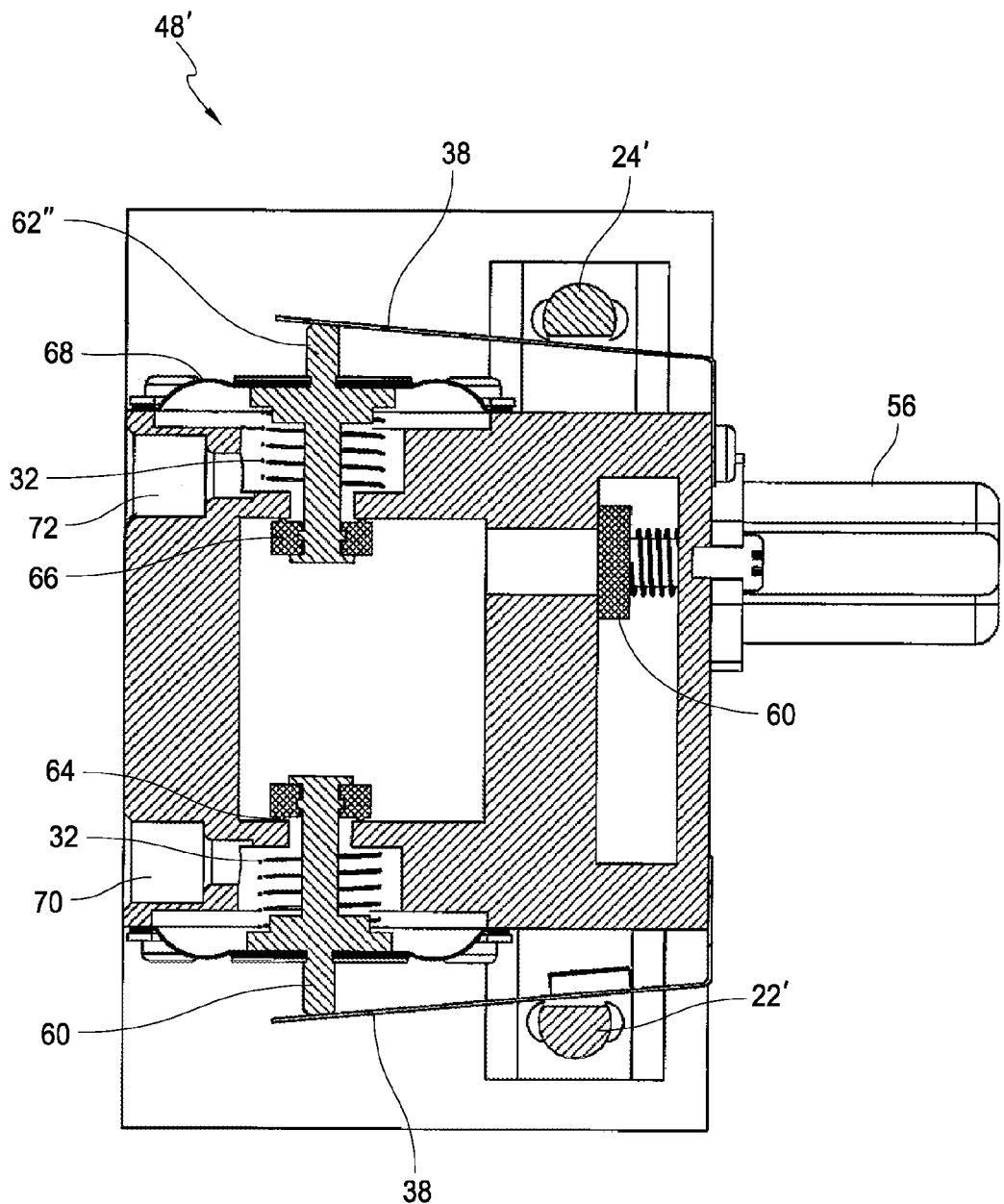
FIG. 17 is a cross-section of the heating source of FIG. 14 showing two valves.

Turning now to FIG. 17, one example of a valve 48' is shown. The valve 48' can comprise two separate valves that are each separately controllable by either the first actuation member 22' or the second actuation member 24'. The selection of the fuel source connection can determine which valve is opened. For example, selecting the first fuel source connection 12 and advancing the first actuation member 22' can allow fuel flow through a preset pressure regulator 16" and can move the first valve body 62' to the open position to allow flow through the outlet 70. Selecting the second fuel source connection 14 and advancing the second actuation member 24' can allow fuel flow through a preset pressure regulator 16' and can move the second valve body 62" to the open position to allow flow through the outlet 72. It is anticipated that only one of the fuel source connections will be selected, though it is possible that in certain configurations, both fuel source connections could be in use.

The fuel selector valve may also include valves in or near the fuel source connections 12, 14. This can help to control the flow of fuel into the fuel selector valve as has been previously discussed.

As before, it will be understood that the valve 50' can be similar to valve 48' or can have a different configuration. For example, the valve 50' may have one or two outlets and it may include a nozzle in the one outlet.

Each of the fuel selector valves described herein can be used with a pilot light or oxygen depletion sensor, a nozzle, and a burner to form part of a heater or other gas appliance. The different configurations of valves and controls such as by the actuation members can allow the fuel selector valve to be used in different types of systems. For example, the fuel selector valve can be used in a dual fuel heater system with separate ODS and nozzles for each fuel. The fuel selector valve can also be used with nozzles and ODS that are pressure sensitive so that can be only one nozzle, one ODS, or one line leading to the various components from the fuel selector valve.

According to some embodiments, a heater assembly can be uses with one of a first fuel type or a second fuel type different than the first. The heater assembly can include a pressure regulator having a first position and a second position and a housing having first and second fuel hook-ups. The first fuel hook-up can be used for connecting the first fuel type to the heater assembly and the second hook-up can be used for connecting the second fuel type to the heater assembly. An actuation member can be positioned such that one end is located within the second fuel hook-up. The actuation member can have a first position and a second position, such that connecting a fuel source to the heater assembly at the second fuel hook-up moves the actuation member from the first position to the second position. This can cause the pressure regulator to move from its first position to its second position. As has been discussed, the pressure regulator in the second position can be configured to regulate a fuel flow of the second fuel type within a predetermined range.

The heater assembly may also include one or more of a second pressure regulator, a second actuation member, and one or more arms extending between the respective actuation member and pressure regulator. The one ore more arms can be configured to establish a compressible height of a pressure regulator spring within the pressure regulator.

A heater assembly can be used with one of a first fuel type or a second fuel type different than the first. The heater assembly can include at least one pressure regulator and a housing. The housing can comprise a first fuel hook-up for connecting the first fuel type to the heater assembly, and a second fuel hook-up for connecting the second fuel type to the heater assembly. The housing can also include a first inlet, a first outlet, a second outlet configured with an open position and a closed position, and a first valve configured to open and close the second outlet. A first actuation member having an end located within the second fuel hook-up and having a first position and a second position can be configured such that connecting a fuel source to the heater assembly at the second fuel hook-up moves the actuation member from the first position to the second position which causes the first valve to open the second outlet, the second outlet being in fluid communication with the second fuel hook-up.

The first actuation member can be further configured such that connecting the fuel source to the heater assembly at the second fuel hook-up moves the first actuation member from the first position to the second position which causes the at least one pressure regulator to move from a first position to a second position, wherein the at least one pressure regulator in the second position is configured to regulate a fuel flow of the second fuel type within a predetermined range.

The at least one pressure regulator can comprises first and second pressure regulators, the first pressure regulator being in fluid communication with the first fuel hook-up and the second pressure regulator being in fluid communication with the second fuel hook-up.

Similarly, the first valve can be configured to open and close both the first and second outlets or there can be a second valve configured to open and close the first outlet. The housing may include addition, inlets, outlets and valves. Also a second actuation member may be used positioned within the first fuel hook-up.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A heater assembly for use with one of a first fuel type or a second fuel type different than the first, the heater assembly comprising:
    a pressure regulator having a first position and a second position;
    a housing having first and second fuel hook-ups, the first fuel hook-up for connecting the first fuel type to the heater assembly and the second hook-up for connecting the second fuel type to the heater assembly;
    an actuation member having an end located within the second fuel hook-up and having a first position and a second position, the actuation member configured such that connecting a fuel source to the heater assembly at the second fuel hook-up moves the actuation member from the first position to the second position which causes the pressure regulator to move from the first position to the second position;
    wherein the pressure regulator in the second position is configured to regulate a fuel flow of the second fuel type within a predetermined range.

2. The heater assembly of claim 1, further comprising a spring operatively coupled to the actuation member to bias the actuation member towards the first position.

3. The heater assembly of claim 1, wherein the pressure regulator in the first position is configured to regulate a fuel flow of the first fuel type within a predetermined range different than the predetermined range for the second fuel type.

4. The heater assembly of claim 1, further comprising a second pressure regulator configured to regulate a fuel flow of the first fuel type within a predetermined range different than the predetermined range for the second fuel type.

5. The heater assembly of claim 1, wherein the actuation member comprises a rod configured for linear advancement from the first position to the second position.

6. The heater assembly of claim 5, wherein the rod extends along a longitudinal axis and has a plurality of longitudinal cross-sections of different shapes.

7. The heater assembly of claim 6, wherein a first section of the actuation member is associated with the pressure regulator in the first position and a second section of the actuation member is associated with the pressure regulator in the second position, the first section having a longitudinal cross-section of a different shape than the second section.

8. The heater assembly of claim 7, further comprising an arm extending between the actuation member and the pressure regulator, and a pressure regulator spring, the arm configured to establish the compressible height of the pressure regulator spring.

9. The heater assembly of claim 7, wherein the rod, including the first section has a substantially circular cross-section, the second section comprising a flat surface.

10. The heater assembly of claim 9, further comprising an arm extending between the actuation member and the pressure regulator, and a pressure regulator spring, the arm configured to establish the compressible height of the pressure regulator spring.

11. The heater assembly of claim 1, wherein the housing further comprises:
    a first inlet;
    a first outlet;
    a second outlet; and
    a first valve configured to open and close both of the first and second outlets.

12. The heater assembly of claim 11, further comprising a control valve.

13. The heater assembly of claim 11, the control valve comprising first and second solenoids.

14. The heater assembly of claim 11, further comprising first and second nozzles.

15. The heater assembly of claim 14, further comprising first and second pilots or oxygen depletion sensors.

16. The heater assembly of claim 11, wherein the housing further comprises:
    a second inlet;
    a third outlet;
    a fourth outlet; and
    a second valve configured to open and close both the third and fourth outlets.

17. The heater assembly of claim 16, wherein the actuation member comprises a rod configured for linear advancement from the first position to the second position, the rod extending along a longitudinal axis and having a plurality of longitudinal cross-sections of different shapes.

18. The heater assembly of claim 17, wherein the rod having a first section associated with the pressure regulator in the first position and a second section of the rod is associated with the pressure regulator in the second position, the first section having a longitudinal cross-section of a different shape than the second section.

19. The heater assembly of claim 18, wherein the rod having third and fourth sections associated with the first valve, the third and fourth sections having different shaped longitudinal cross-sections.

20. The heater assembly of claim 19, wherein the rod having fifth and sixth sections associated with the second valve, the fifth and sixth sections having different shaped longitudinal cross-sections.

21. The heater assembly of claim 20, further comprising a first arm extending between the rod and the pressure regulator, a second arm extending between the rod and the first valve, and a third arm extending between the rod and the second valve, the arms respectively configured to establish the compressible height of the pressure regulator spring, and the position of the respective valves to open and close respective outlets.

22. The heater assembly of claim 1, further comprising a first valve positioned at the first fuel hook-up, the first valve configured to open when the fuel source is connected to the heater assembly at the first fuel hook-up.

23. The heater assembly of claim 22, wherein the actuation member further comprises a second valve positioned at the second fuel hook-up, the second valve configured to open when the fuel source is connected to the heater assembly at the second fuel hook-up.

24. A heater assembly for use with one of a first fuel type or a second fuel type different than the first, the heater assembly comprising:
at least one pressure regulator;
a housing comprising:
a first fuel hook-up for connecting the first fuel type to the heater assembly;
a second fuel hook-up for connecting the second fuel type to the heater assembly;
a first inlet;
a first outlet;
a second outlet configured with an open position and a closed position;
a first valve configured to open and close the second outlet;
a first actuation member having an end located within the second fuel hook-up and having a first position and a second position, the first actuation member configured such that connecting a fuel source to the heater assembly at the second fuel hook-up moves the actuation member from the first position to the second position which causes the first valve to open the second outlet, the second outlet being in fluid communication with the second fuel hook-up.

25. The heater assembly of claim 24, further comprising a spring operatively coupled to the first actuation member to bias the first actuation member towards the first position.

26. The heater assembly of claim 24, wherein the first actuation member is further configured such that connecting the fuel source to the heater assembly at the second fuel hook-up moves the first actuation member from the first position to the second position which causes the at least one pressure regulator to move from a first position to a second position, wherein the at least one pressure regulator in the second position is configured to regulate a fuel flow of the second fuel type within a predetermined range.

27. The heater assembly of claim 26, wherein at least one pressure regulator in the first position is configured to regulate a fuel flow of the first fuel type within a predetermined range different than the predetermined range for the second fuel type.

28. The heater assembly of claim 24, wherein the at least one pressure regulator comprises first and second pressure regulators, the first pressure regulator being in fluid communication with the first fuel hook-up and the second pressure regulator being in fluid communication with the second fuel hook-up.

29. The heater assembly of claim 24, wherein the first actuation member comprises a rod configured for linear advancement from the first position to the second position.

30. The heater assembly of claim 29, wherein the rod extends along a longitudinal axis and has a plurality of longitudinal cross-sections of different shapes.

31. The heater assembly of claim 30, wherein a first section of the rod is configured to associate with the first valve and the second outlet in the closed position and a second section of the rod is configured to associate with the first valve and the second outlet in the open position, the first section having a longitudinal cross-section of a different shape than the second section.

32. The heater assembly of claim 31, further comprising an arm extending between the first actuation member and the first valve.

33. The heater assembly of claim 24, wherein the first valve is configured to open and close both the first and second outlets.

34. The heater assembly of claim 33, wherein the housing further comprises:
a second inlet;
a third outlet;
a fourth outlet; and
a second valve configured to open and close both the third and fourth outlets.

35. The heater assembly of claim 34, wherein the first actuation member is configured with a first section that associates with the first valve such that the first outlet is open and the second outlet is closed and a second section that associates with the second valve such that the third outlet is open and the fourth outlet is closed.

36. The heater assembly of claim 35, wherein the first actuation member is configured with a third section that associates with the first valve such that the first outlet is closed and the second outlet is open and a fourth section that associates with the second valve such that the third outlet is closed and the fourth outlet is open, the first and second sections having a longitudinal cross-section of a different shape than the third and fourth sections.

37. The heater assembly of claim 36, further comprising a first arm extending between the first actuation member and the first valve, and a second arm extending between the first actuation member and the second valve, the arms respectively configured to establish the position of the respective valves to open and close respective outlets.

38. The heater assembly of claim 37, further comprising a third arm extending between the first actuation member and the at least one pressure regulator, the third arm configured to establish the compressible height of a pressure regulator spring.

39. The heater assembly of claim 24, further comprising a second valve configured to open and close the first outlet.

40. The heater assembly of claim 39, wherein the housing further comprises:
a second inlet;
a third outlet;
a fourth outlet;
a third valve configured to open and close the third outlet; and a fourth valve configured to open and close the fourth outlet.

41. The heater assembly of claim 24, further comprising a second actuation member positioned within the first fuel hook-up.

42. The heater assembly of claim 41, wherein the second actuation member comprises a fuel hook-up valve to open and close the first fuel hook-up and configured to open when the fuel source is connected to the heater assembly at the first fuel hook-up.

43. The heater assembly of claim 42, wherein the first actuation member further comprises a valve positioned at the second fuel hook-up, the valve configured to open when the fuel source is connected to the heater assembly at the second fuel hook-up.

44. The heater assembly of claim 41, wherein the second actuation member comprises a rod having a plurality of sections of different cross-sectional area.

45. The heater assembly of claim 24, further comprising a control valve in fluid communication with the first inlet.

46. The heater assembly of claim 24, further comprising first and second nozzles in fluid communication with the respective first and second outlets.

47. The heater assembly of claim 24, further comprising first and second pilots or oxygen depletion sensors in fluid communication with the respective first and second outlets.

* * * * *